INVENTORS
PAUL L. ALSPAUGH
JOHN W. HEIMASTER
ROY L. McNEILL
BY
Barnwell R. King
ATTORNEY March 11, 1958 P. L. ALSPAUGH ET AL 2,826,402
REMOTELY CONTROLLED MINING SYSTEM
Filed May 11, 1953 15 Sheets-Sheet 15

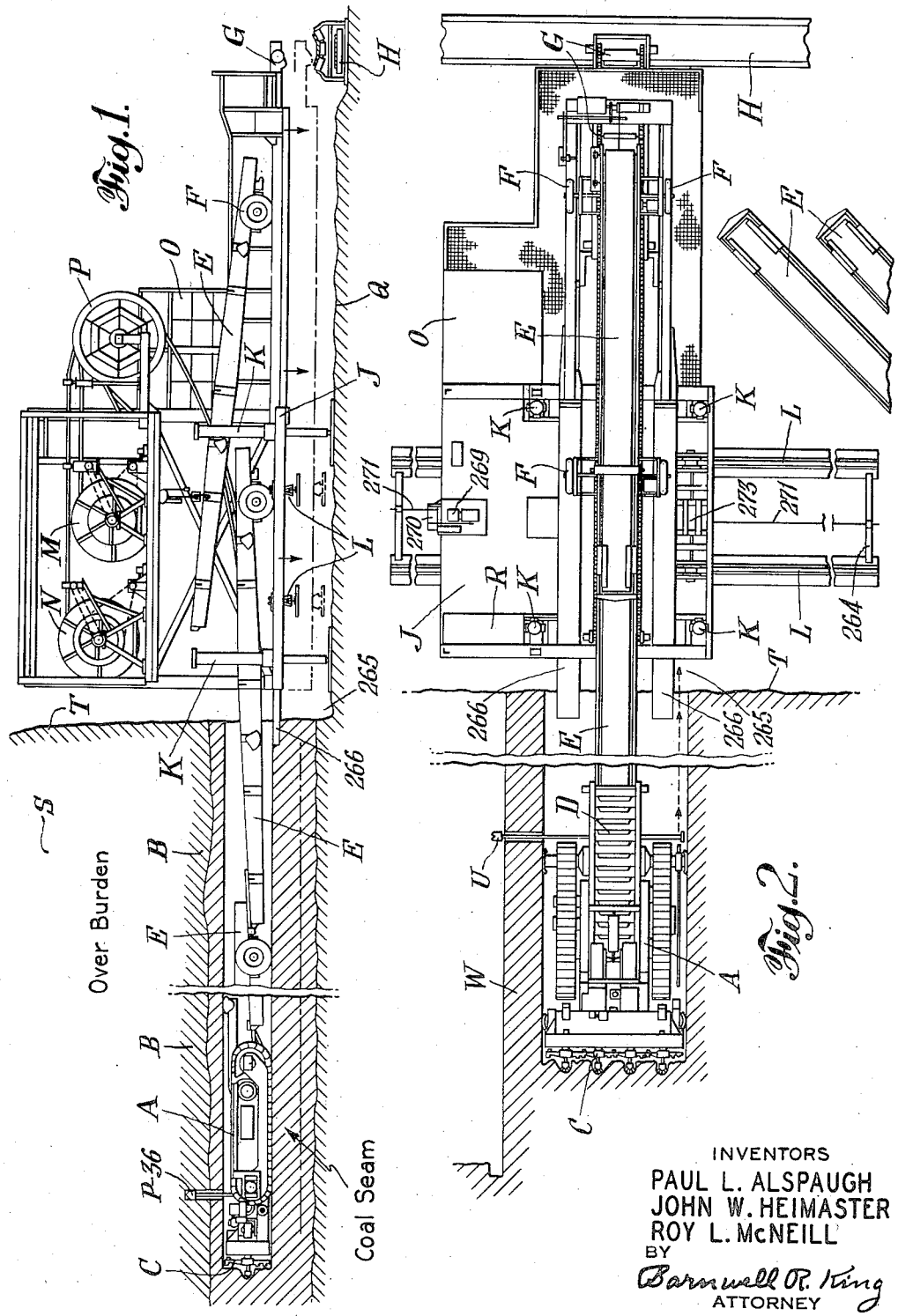

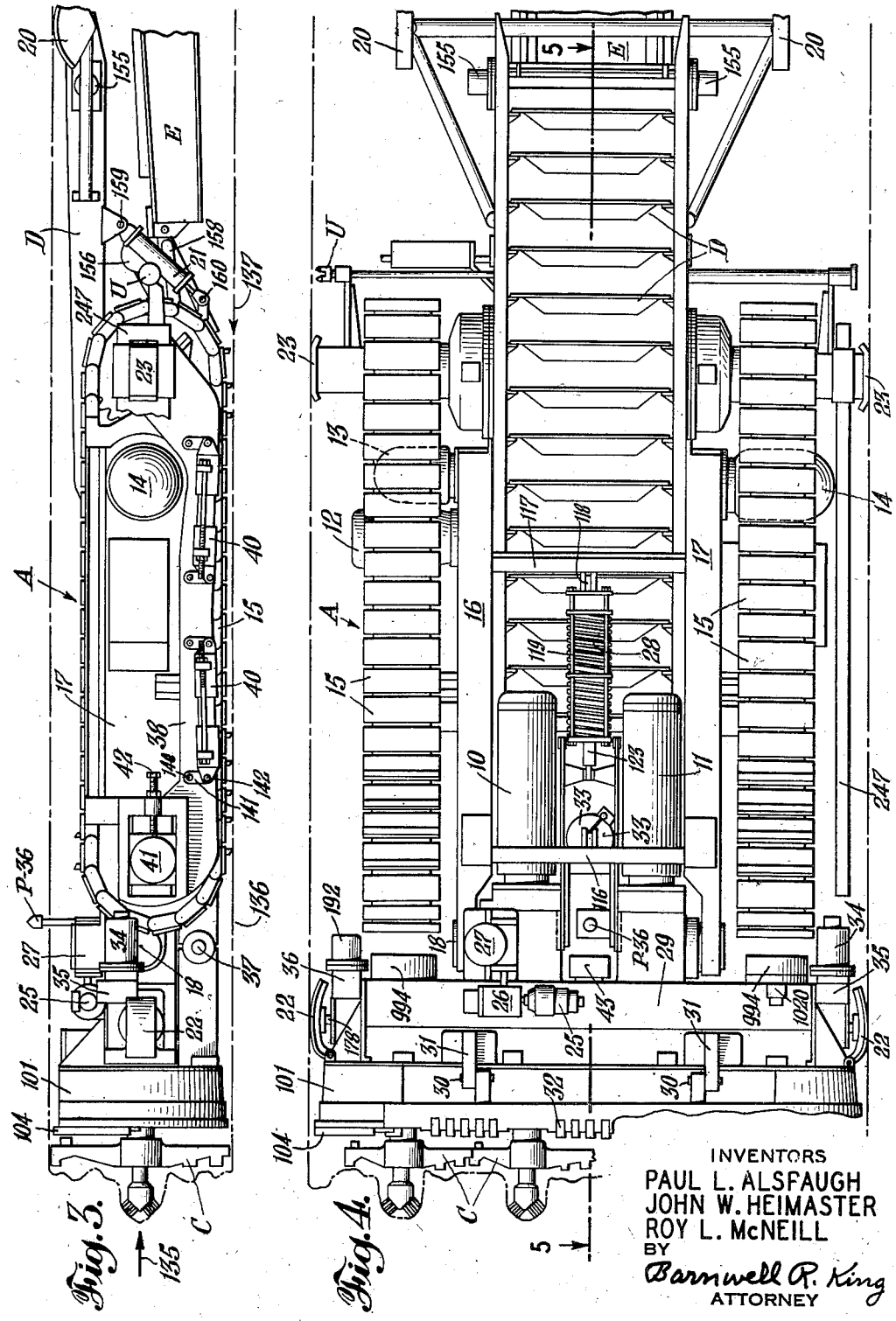

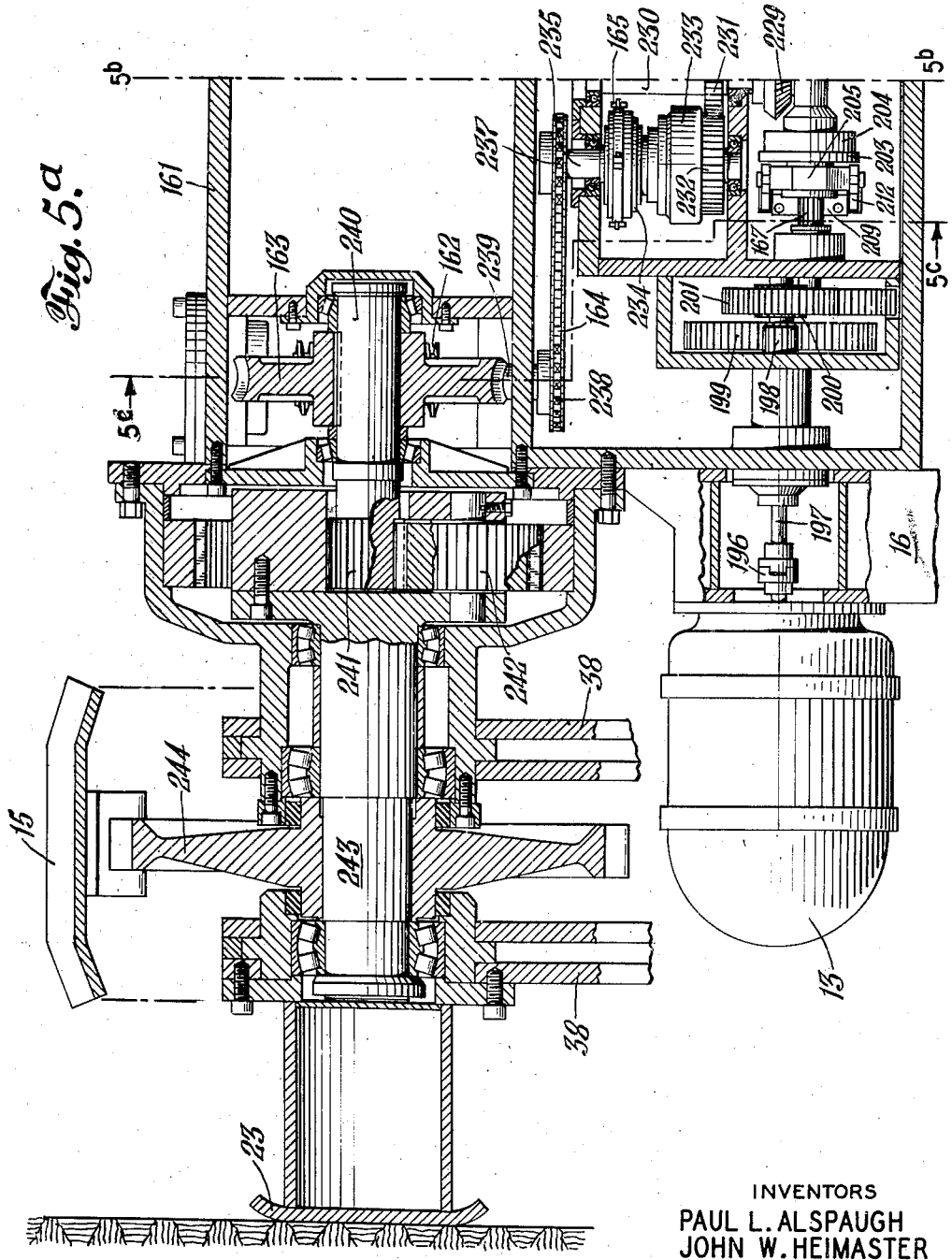

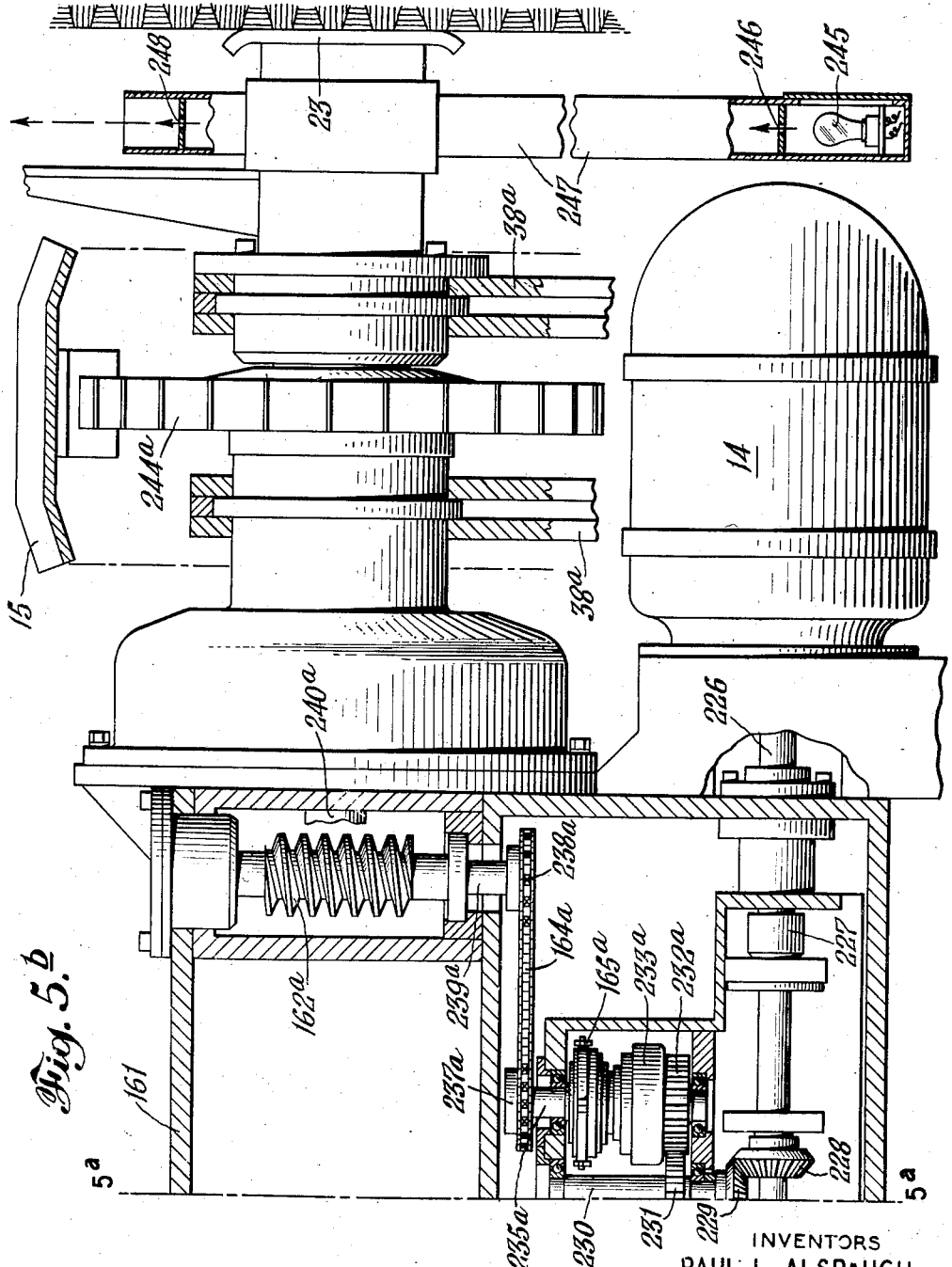

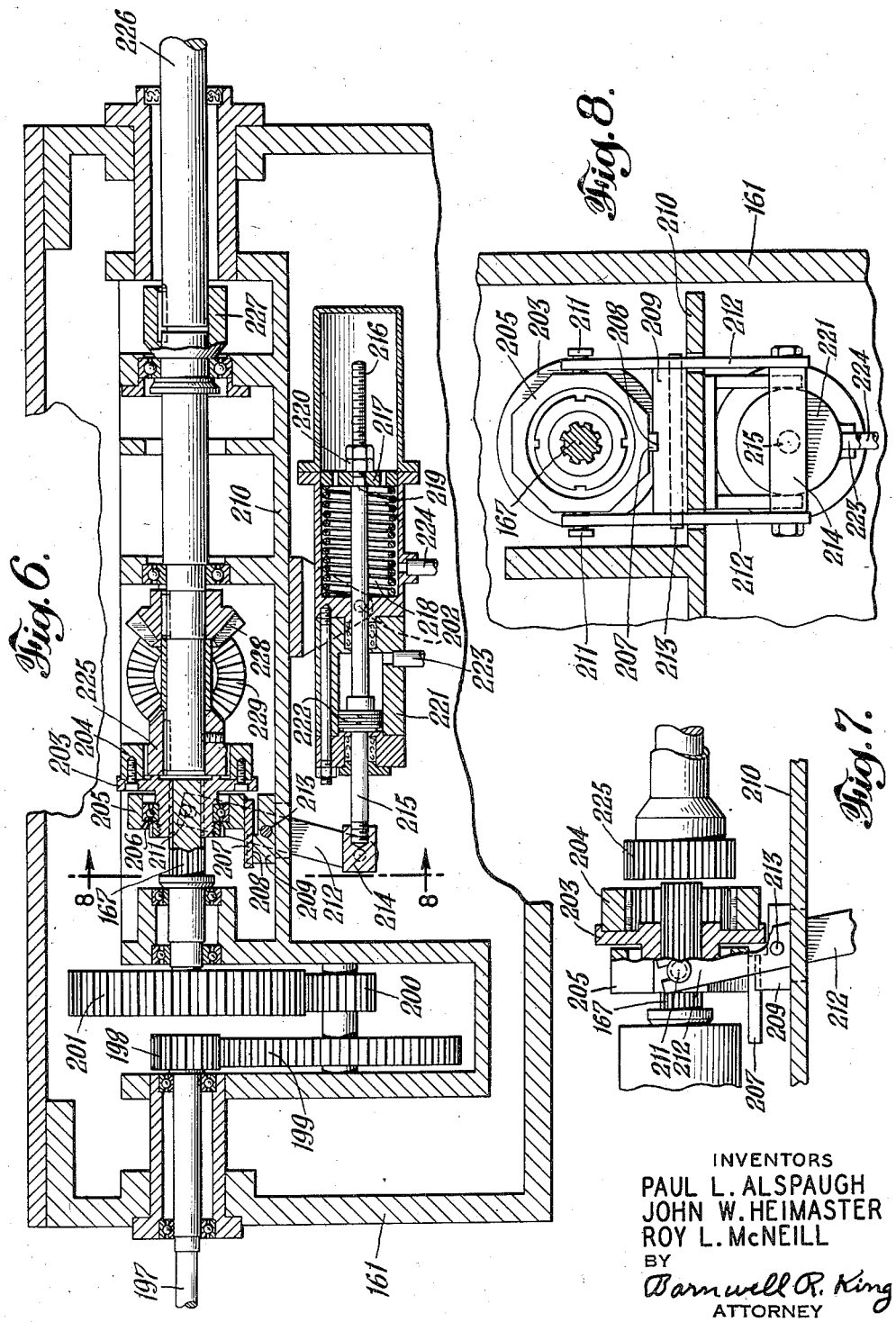

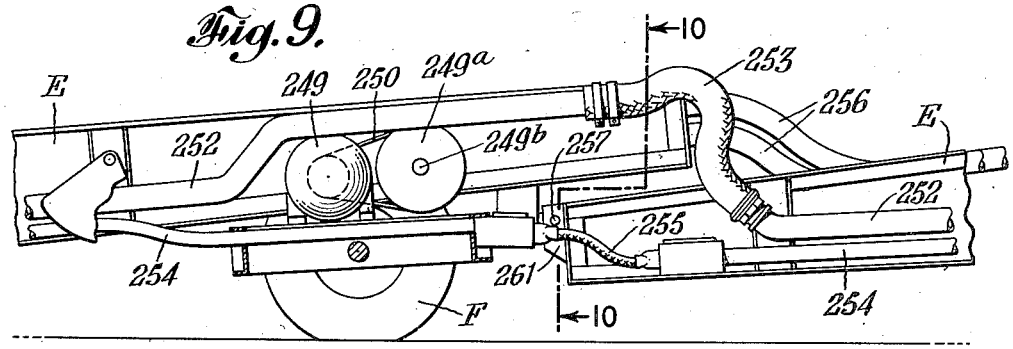
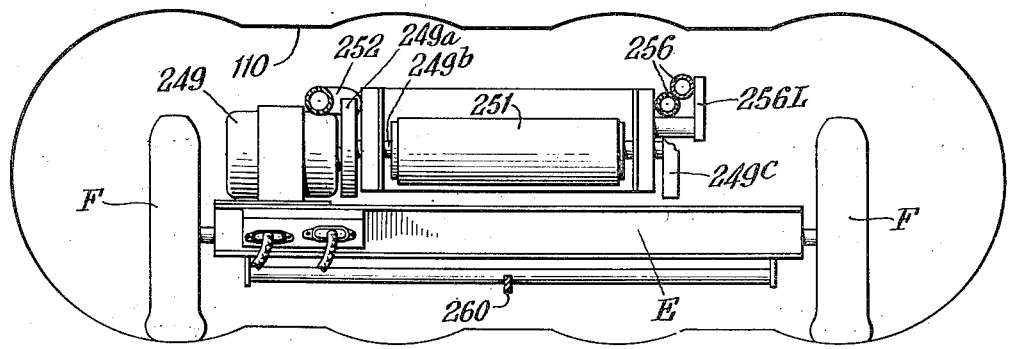

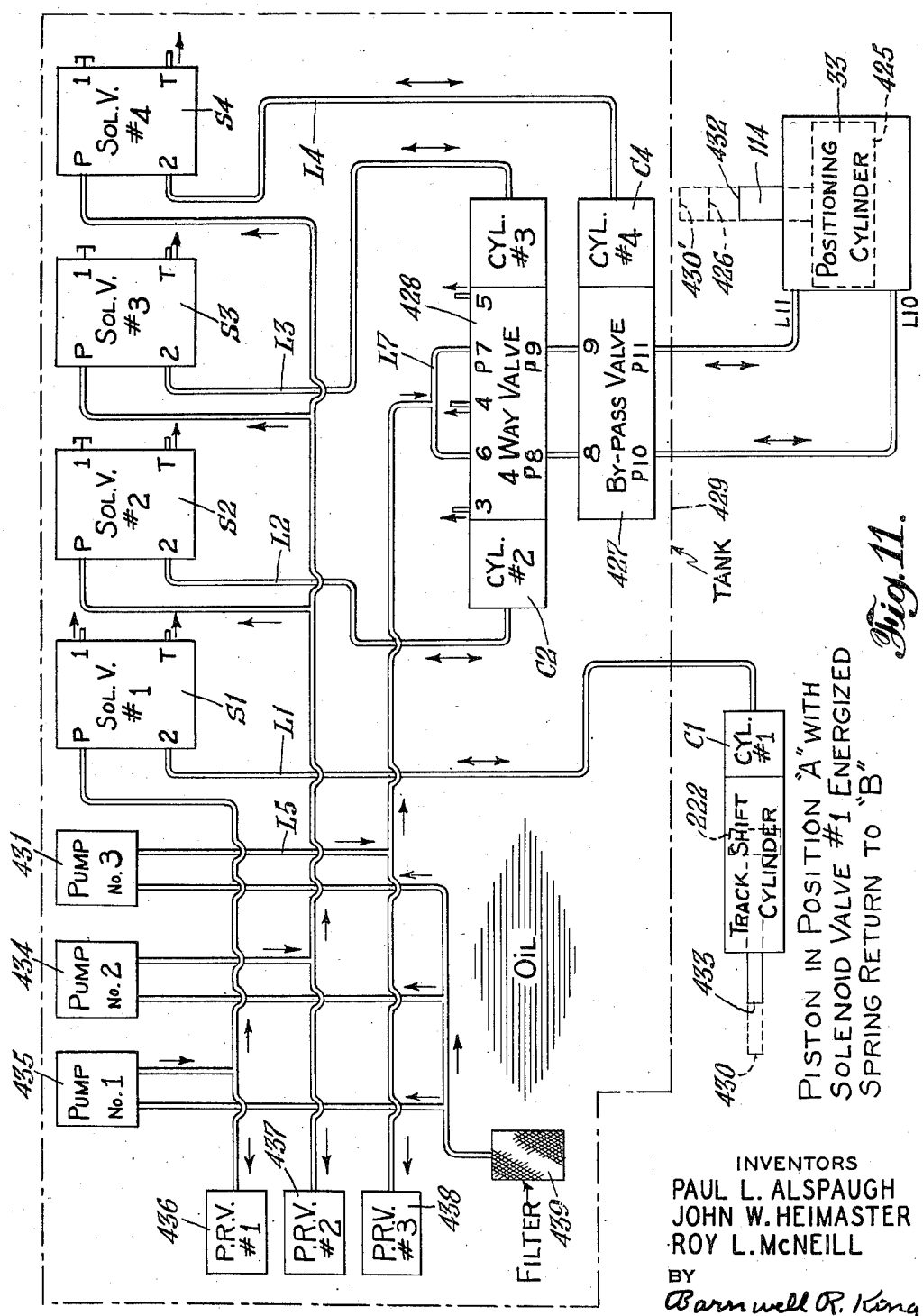

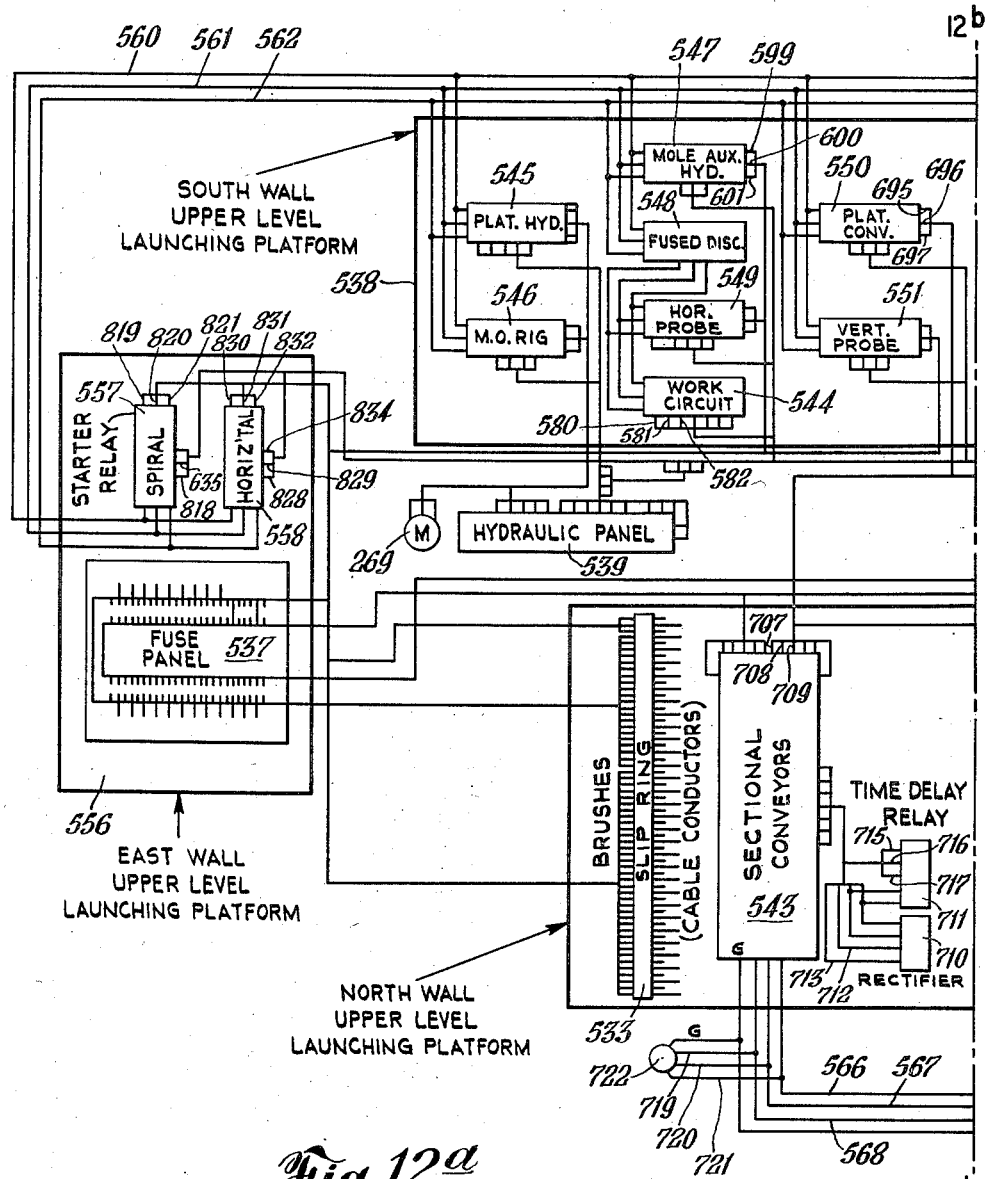

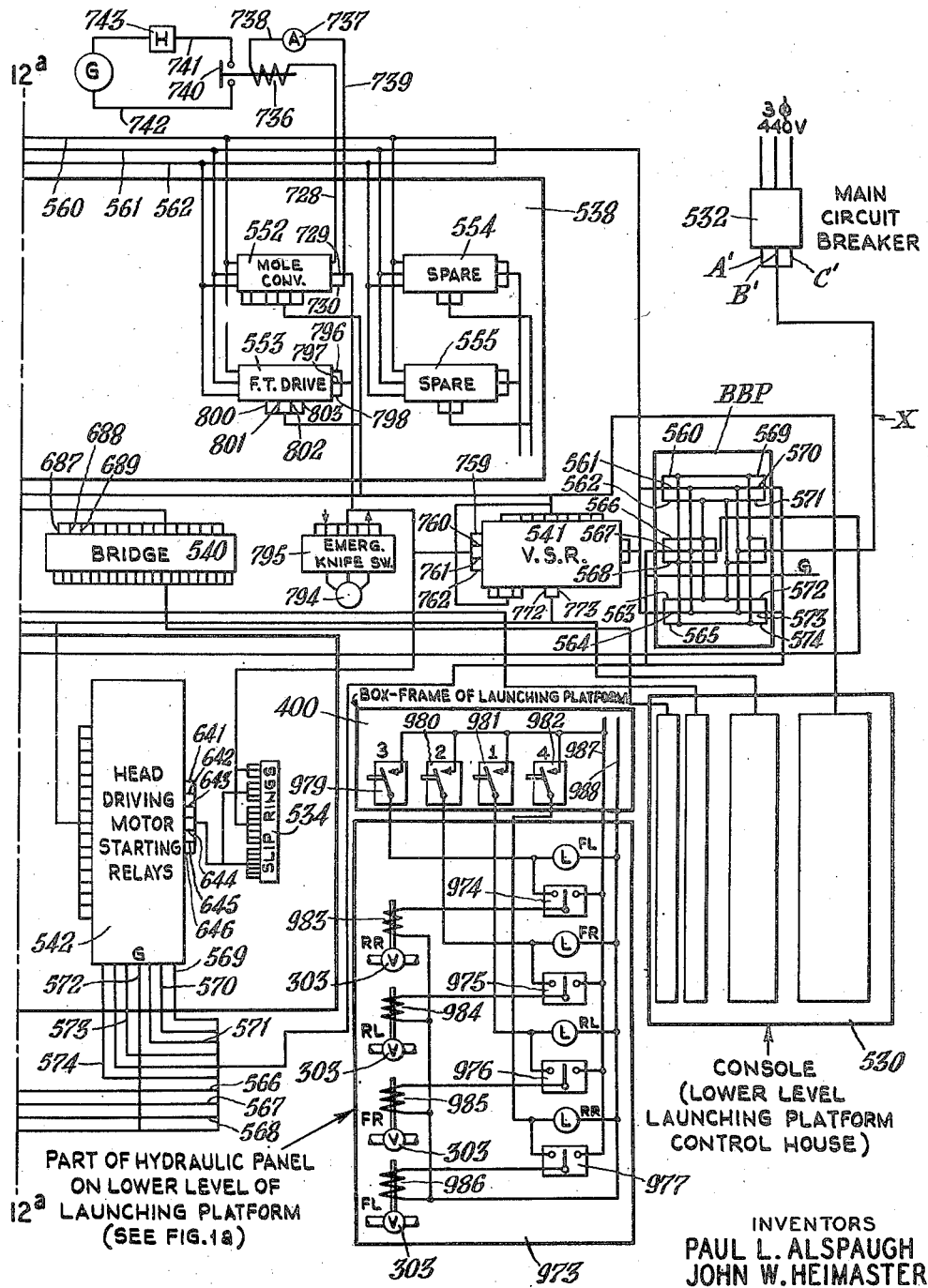

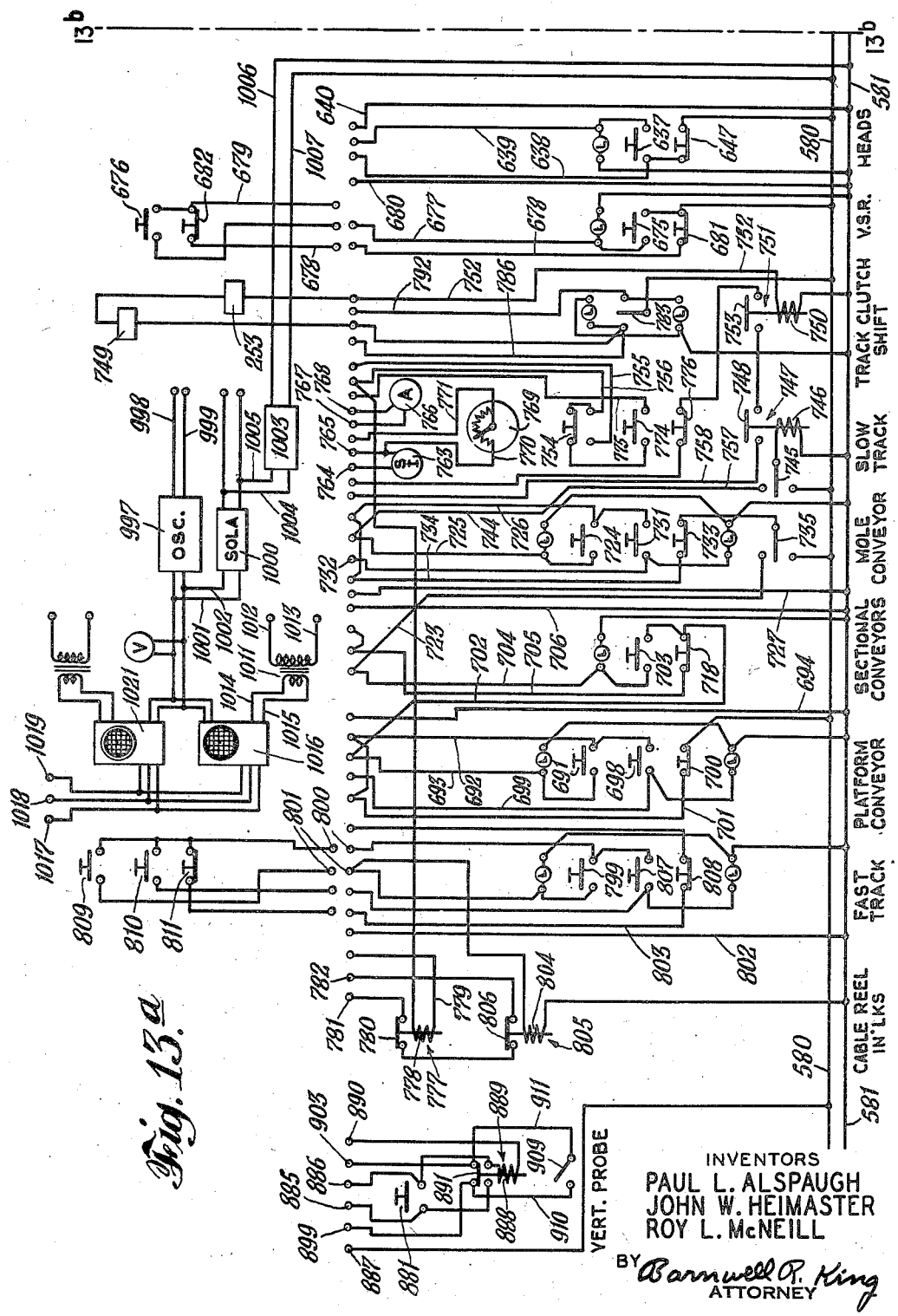

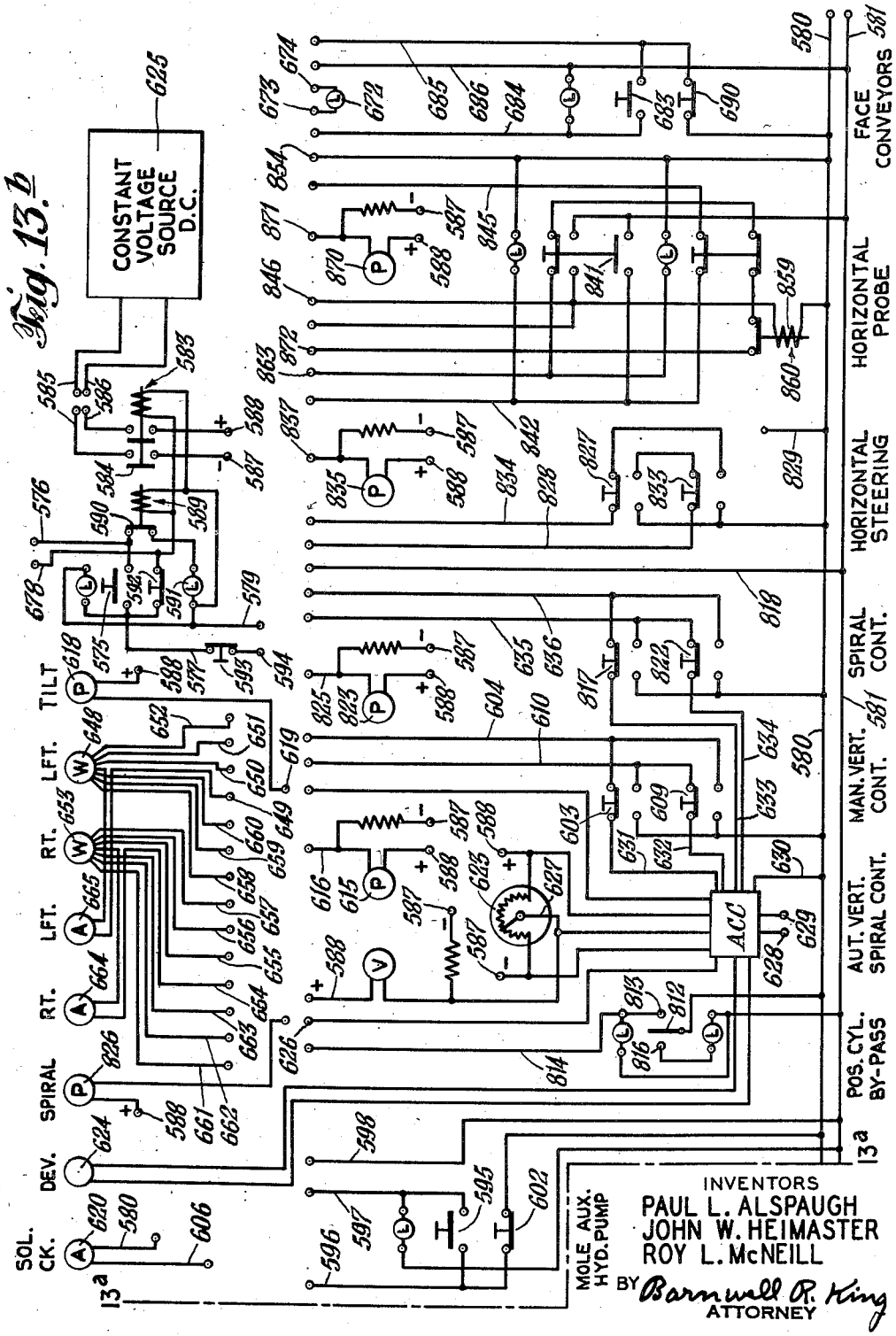

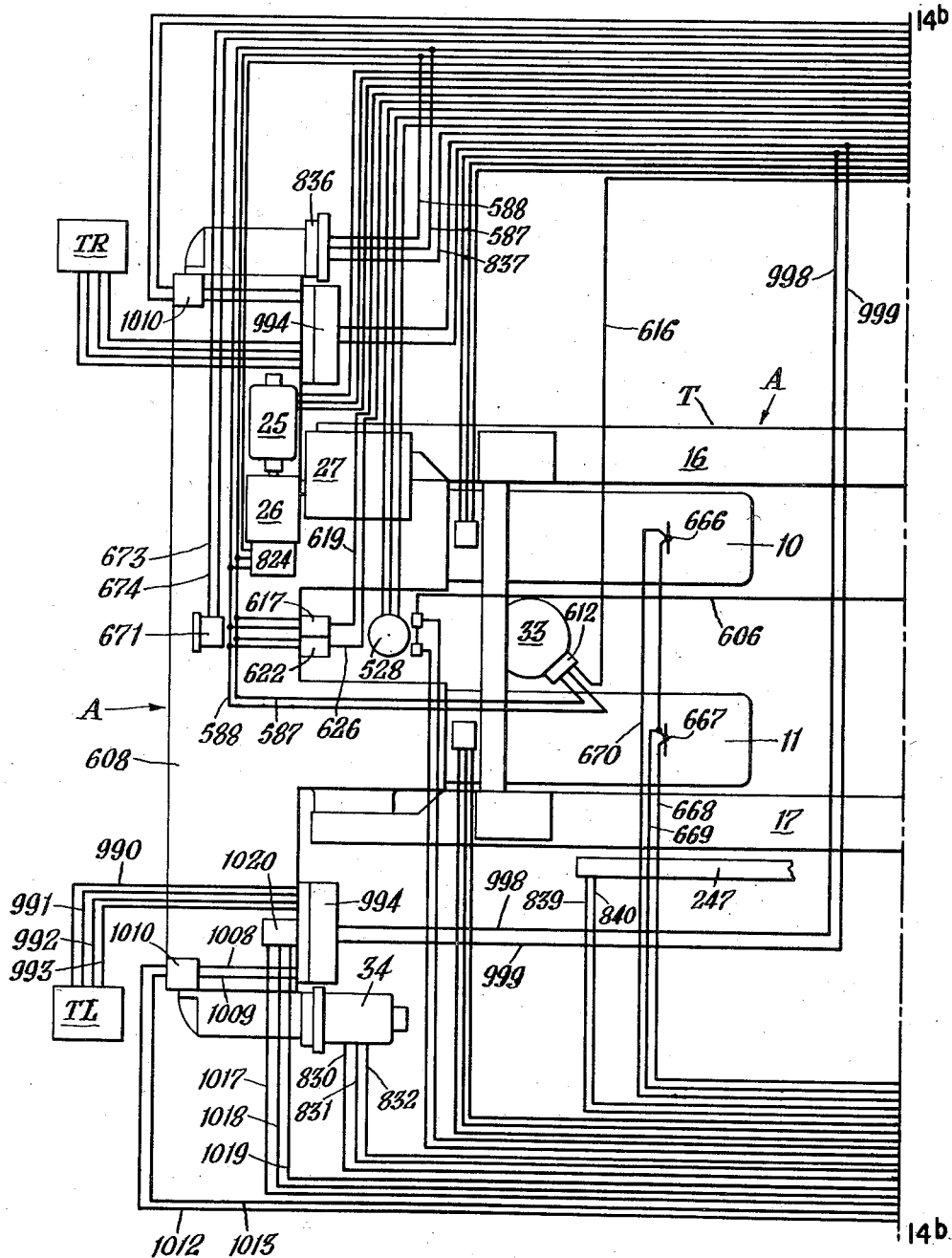

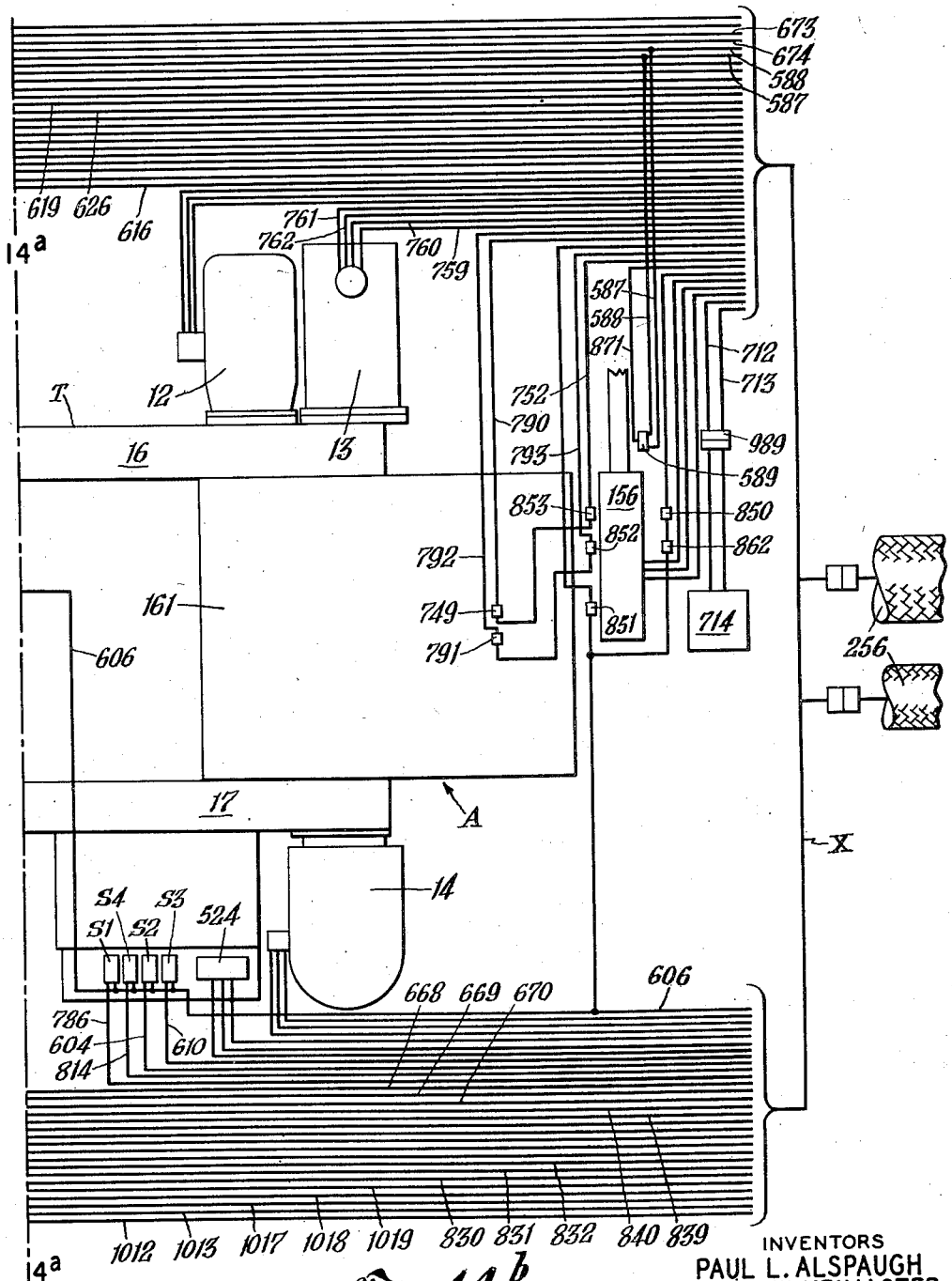

INVENTORS
PAUL L. ALSPAUGH
JOHN W. HEIMASTER
ROY L. McNEILL
BY
Barnwell R. King
ATTORNEY United States Patent Office 2,826,402
Patented Mar. 11, 1958

2,826,402
REMOTELY CONTROLLED MINING SYSTEM

Paul L. Alspaugh and John W. Heimaster, South Charleston, and Roy L. McNeill, Charleston, W. Va., assignors to Union Carbide Corporation, a corporation of New York Application May 11, 1953, Serial No. 353,932

15 Claims. (Cl. 262—26)

This invention relates to remotely controlled mining systems, and more particularly to improvements in the remotely controlled bore mining apparatus and process disclosed in our application Serial No. 85,222, filed April 2, 1949, now Patent No. 2,699,328, for "Mining Machine" of which the present case is a continuation-in-part.

Such application discloses an entirely new concept of mining in that the actual mining operation is remotely controlled at a station which is remote with respect thereto, being located outside of the bore hole. As a result, the need for timbering and ventilation are eliminated, and safer, healthier, more comfortable, easier and cleaner working conditions are provided for the operators; all of which contribute toward more efficient and effective utilization of manpower. However, such machine had certain limitations involving or caused by the following: the output per foot of advance, the percentage of recovery of material available in the strata being mined, the utilization of operating time, the means for transporting the mined material through the bore hole, the guiding means, the handling of the cables, the manipulation of the machine outside of the bore hole, and the non-cutting periods.

Therefore, the main object of this invention is to overcome such limitations. Other objects will appear from the following description.

Increased output and recovery have been substantially increased by widening the machine to an amount that we have found to be adequate for self-support of the roof of the bore hole, and by reducing the non-cutting (non-mining) time. This is accomplished by means of a novel train of conveyor sections for continuously transporting the mined material out of the hole as it is being bored; and by means of a novel launching platform for the machine, which platform also serves as a control station and part of the conveyor system. To enable the machine to make a repass into an already cut hole for deepening it and getting more material out of a hole without widening it, the launching platform with the mining machine is provided with means whereby it can be raised and lowered to bring the machine to a desired elevation wtih respect to the seam face, where it is automatically levelled. Increased certainty for steering in a vertical plane is accomplished by means making the front end face cutters simultaneously capable of being transversely tilted upwardly or downwardly, and making the machine shorter and provided with greater clearance. A factor contributing to increased output is means providing improved traction in the continuous treads, having more uniform distribution of load during cutting, and also having them yieldable by unique means in event the floor is uneven.

In general the remotely controlled mining system of the present invention comprises a bore mining machine, a launching platform, continuous transporting means for conveying the material being mined, and remote control means for the entire system.

The mining machine is provided with a four cutter head having an exceptionally high production rate. In operation the machine bores a 9'8" x 38" hole to a depth (length) of the order of 1000'. The machine mines (bores) in a substantially straight line, normally following a selected stratum. No timers are used. The entire operation is controlled from a remote station located outside of the bore, by raising or lowering the head to direct the course of the machine up or down, plus a small amount of horizontal steering and correction for spiral. The machine itself is relatively simple, being powered by seven electric motors having a total horsepower of about 144 in the present example. Behind the outer cutting heads and revolving on the same shaft are paddles that sweep the cuttings to the middle of the machine, where they are picked up by a central flight conveyor and carried from the front to the rear of the machine. From upper and lower cutter blades back, the whole cutting end is encased in a novel shroud, so that the cuttings can escape effectively only by way of the machine conveyor. Control signals and power are transmitted to the machine through cable means carried above the bottom of the bore hole by the conveyor train.

The launching platform is a self-propelled, double-decked steel structure. On the first deck is a runway for the mining machine. In the center of the runway is a conveyor. Adjacent to it is a control panel for moving the platform, and an enclosed cab that houses the remote controls. On the second deck are reels for the power and control cables, and electric switching means. This whole structure is mounted on four hydraulic jacks, which can be adjusted so that the launching platform is at the proper height for the mining machine to enter a seam. In order to move along the face of the seam, such jacks are raised enough to allow rails suspended from the undercarriage to be rolled out by an electrically-driven winch. The jacks are let down until the platform rests on wheels on the rails and the four hydraulic jacks are off the ground. Then a winch pulls the platform over to the next position. If the exposed face of the seam is irregular, the platform is turned to the correct angle. When the plaform is in the correct position, the hydraulic jacks are raised to support it at the proper height.

The conveying train comprises a series of tandem belt conveyors in trailer form. Each conveyor section is about 30 feet long and is powered with an individual motor. In practice the machine first mines approximately its own length, and then the first conveyor section is attached to the machine. A conveyor length is mined and second section is attached to the first. Succeeding conveyors are attached in a similar manner. Only a short time is required to connect each conveyor section. Discharge from the machine or last conveyor section as the boring operation progresses is to the conveyor on the floor of the launching platform. The cuttings are transferred by such conveyor to a face conveyor.

Since the machine is not accompanied by an operator, steering it over its 700 to 1,000 feet or more of travel is accomplished by means of a battery of indicating and control instruments and equipment located on the launching platform. Including a footage counter, the total number of instruments is about 20. Hydraulically powered reels with spooling devices are used to reel in, pay out and store the cables. The capacity of each reel is 1,000 feet on the present machine.

Vertical positioning in the seam is indicated by "stratascopes," or electric sensing devices. Two are employed —one on the outermost cutting tooth of each outside cutting head. The stratascopes are coupled to two polar oscilloscopes in the control house. Each oscilloscope has a circular screen and the path cut by each sensitive tooth is registered as a circle on the screens. When the stratascope teeth cut anything of different hardness than the material being mined, irregularities, or "blips," appear in the light circles on the screens. Thus, for example, a band shows as blips on one part of the circle, and if it moves in either direction, it normally indicates that the machine is moving up or down and thus permits the operator to correct the direction as necessary. Correction is made by actuating a hydraulic cylinder to raise or lower the head, which is pivoted on the main body of the machine. A change in direction, either climb or drop, of as much as one inch in one foot is possible.

Drift of the machine from one side to the other in cutting is caused by faulty direction, by worn bits on one side or the other, or by a change in the character of the seam. A light beam is initially employed for checking horizontal course, but major reliance is placed on a horizontal probe at the rear of the machine on the side next to the rib. Normally, when a new conveyor section is added, such probe is activated to bore through the rib. The drill reverses automatically as soon as its breaks through and the width of such rib is registered on an instrument in the control house. If drifting is occurring, guide shoes on the side at the front of the machine are energized to correct the course of the machine by pushing against the side of the hole. The maximum push, if used, provides a rather sharp change in course.

"Spiralling" also must be corrected when it occurs. It can result from a piece of material under the track lifting one side of the machine. Instruments in the control house show this action, and correction is made by raising or lowering the head on one side by moving a trunnion bearing and shaft up or down in ways in which the bearing is mounted.

To begin mining, the launching platform carrying the mining machine, is located at the proper angle and height with respect to a selected seam face. If the launching platform does not abut the seam face, the gap is bridged by extending cantilever telescopic sections of a runway on the platform. The operator starts the cutting heads and conveying system, and then moves the machine ahead on its crawler tracks. Hard-tipped bits on the rotating cutting heads cut circumferential grooves in the seam face, breaking out the material between the grooves. The cuttings fall into a shroud opening where paddles sweep the material into a conveyor, carrying it to the rear of the machine.

At the rear of the machine, the coal falls from the machine conveyor to the conveyor on the launching platform, thence the continuous stream of coal flows to the face conveyor.

When the mining machine is almost underground, the rear of its conveyor reaches the end of the platform conveyor. At such point, the machine is stopped and a conveyor section is added. To prevent fouling or dragging the mining machine power and control cables, each conveyor has L-shaped hooks on its side which carry such cables.

As each conveyor section reaches the end of the platform conveyor, another is added by means of a tractor-mounted crane that suspends each conveyor section just above the platform conveyor until it is needed. The number of conveyor sections added depends on the depth of the hole to be bored.

When the machine has bored as deeply as desired, the traction motor is reversed and the machine pushes instead of pulls its train of conveyors out of the bore hole. Buckling of the train is avoided by the grooves made by the outer face cutters in boring the hole, which grooves are spaced the same distance as the treads of the wheels carrying the conveyor sections. The train is unhitched as it was assembled. Finally, the machine itself backs out of the bore onto the launching platform.

If the thickness of the seam warrants, the four hydraulic jacks are let down until the platform is in position to make a second cut below the first. When the seam is not thick enough to permit a full bite on the second boring, the material being mined is kept flowing at a rapid rate by increasing the forward speed of the machine.

When the second cut has reached the depth of the first, the process is once again reversed to remove the conveyor sections and the machine. With the mining machine on the launching platform, the latter is moved on its rails so that there will be a wall of sufficient thickness between the boring just made and the one to be started.

In the drawings:

Fig. 1 is a fragmentary view of a bore mining system, illustrating the invention, showing in side elevation a bore mining machine in a hole or bore it has cut in a coal seam, the machine being followed by conveyor sections which are attachable in sequence on a launching platform located outside of the bore;

Fig. 2 is a fragmentary top plan view of the apparatus shown in Fig. 1;

Fig. 3 is a larger side view of the machine shown in Fig. 1;

Fig. 4 is a fragmentary top plan view of the machine shown in Fig. 3;

Fig. 5a is a fragmentary view partly in plan and partly in section of the transmission mechanism for driving the machine forward during cutting (mining) at a comparatively slow speed with the right rear driving sprocket shown engaging the treads at one extremity;

Fig. 5b is a view similar to Fig. 5a, showing the portion of the mechanism on the left side of the line 5b in Fig. 5a for driving the machine at a fast or tramming speed;

Fig. 6 is a sectional view in elevation of the mechanism for driving (tracking) the machine and the clutch for connecting it with the low speed driving (slow track) motor;

Fig. 7 is a fragmentary view partly in elevation and partly in section of the shiftable gear clutch by means of which the low speed driving mechanism is connected;

Fig. 8 is a fragmentary sectional view taken on line 8—8 of Fig. 6;

Fig. 9 is a view in side elevation of the rear end portion of one conveyor section and the front end portion of another connected together;

Fig. 10 is a sectional view taken on the line 10—10 of Fig. 9;

Fig. 11 is a diagram of a hydraulic system of the mining machine;

Figs. 12a and 12b are left and right halves of a simplified general circuit diagram of the launching platform;

Figs. 13a and 13b are left and right halves of the control house circuit diagram;

Figs. 14a and 14b are left and right halves of the bore mining machine circuit diagram;

*General procedure*

Figure 15:
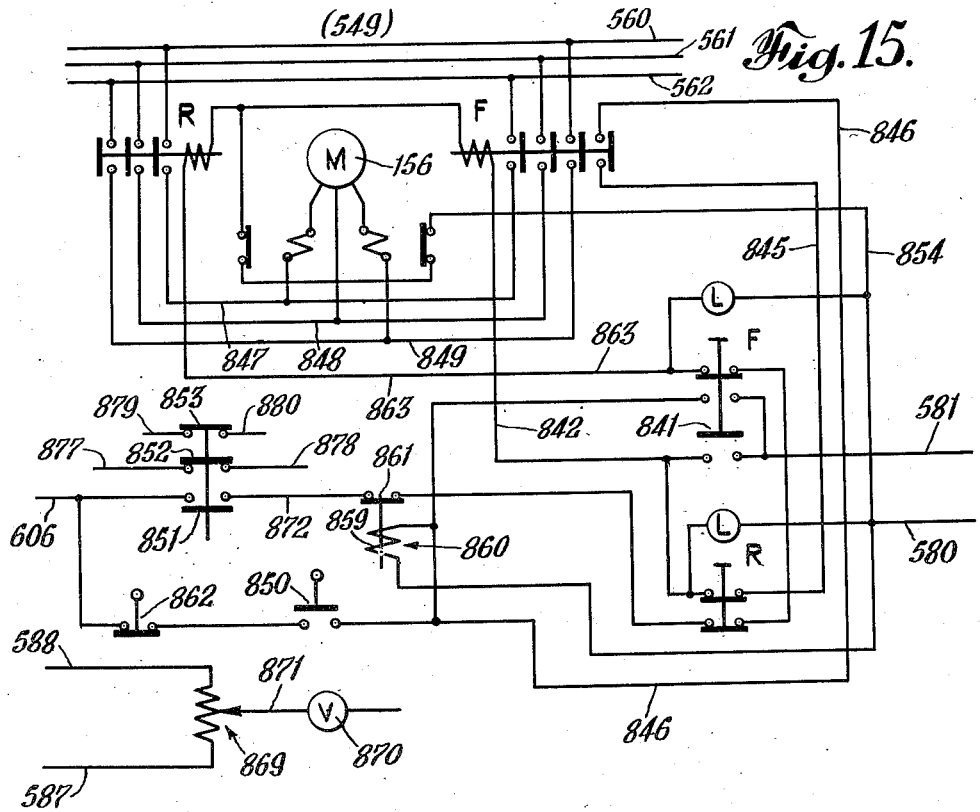
Fig. 15 is a circuit diagram of the horizontal probe control circuit.

Prior to the beginning of a coal cutting and removing operation the face of the coal seam B, Figs. 1 and 2, is exposed for a substantial distance by the formation of a ledge Q by removal of a portion of the hillside S sufficient to expose an upstanding face T of the coal seam for a desirable distance. The remotely controlled mining machine A enters the seam B of coal, for example, cutting a hole of oblong cross section with the aid of four front end face cutters C, one pair of which rotates in an opposite direction to the other pair. A flight conveyor D in the longitudinal center of the machine A conveys the cut coal rearwardly and delivers it onto a train of belt conveyor sections E connected in series. Each conveyor section has a pair of supporting wheels F and a driving motor for actuating the conveyor belt. An additional conveyor section is added to the train as the machine proceeds into the coal seam. The outermost conveyor section delivers the cut coal onto a flight conveyor G substantially aligned with the machine and conveyor section E. This flight conveyor G is extensible to deliver the cut coal onto another conveyor H carrying the coal to a hopper or for delivery into trucks or wherever needed. A launching platform J is adjustable in height by means of hydraulic jacks K to raise or lower the platform to the desired level at which the mining machine A is to enter the coal seam.

At the start of the operation the mining machine A rests on the platform J near the exposed face of the coal seam and on entry into the seam additional conveyor sections are raised onto the launching platform by a portable crane, not shown, and attached mechanically and electrically to the preceding machine or conveyor section. The flight conveyor G on the platform J is of such length that after each conveyor section is connected it delivers coal, while advancing with the boring progress, onto the flight conveyor G until the next section is attached. The machine mines the seam as far as the train of conveyor sections and the length of the cables permit. The mining machine A not only advances itself during cutting, at a rate of about 18 to 24 inches a minute, but also pulls the conveyor train.

On completion of a hole the mining machine backs out at a faster rate, pushing back the conveyor train. Operators on the platform disconnect each conveyor section when it has been pushed out of the mine and, with the aid of a crane, lift it from the platform. When the mining machine itself withdraws from the bore hole and is on the platform J then the platform is lowered with the track rails L and, with the aid of a power winch, the platform and machine A are rolled along the rails L in a direction generally parallel to the exposed face of the seam into a position for the machine to make another entry into the seam.

A supporting wall or rib of coal is left in place between bore holes to support the heavy overburden. Where the depth of the coal seam is large enough to warrant a repass of the machine into the same hole for deepening it without widening it, the hydraulic jacks K are operated to lower the platform and machine to a new position enabling the machine to enter the seam again for deepening the already cut hole.

Wind-up reels M and N for the power and control cables are provided with means which maintain a desired tension of the cables as the machine backs out of the hole. The sheave P changes the direction of the cables for convenience in winding and unwinding them.

The machine A is remotely controlled as to speed, stopping, starting and change of direction vertically, or in a horizontal plane, or in both at once, and any tendency for the machine to laterally tilt (spiral) is corrected by remote control. A lateral probe U on a rear portion of the machine is used for drilling through the supporting wall (rib) of coal W between a hole being cut and a previously cut hole in order to guide the machine. The thickness of such intervening wall is indicated in a control room O on the launching platform J.

*The mining machine proper*

The machine is capable of mining about six times as much coal as the machine of our application Serial No. 85,222 (now Patent No. 2,699,328). As shown in Fig. 4 a pair of 60 horsepower, three-phase motors 10 and 11 are geared together for driving the four end face cutters C. A 7½ horsepower motor 12 is provided for driving the flight conveyor D. A 7½ horsepower variable speed motor 13 drives the machine tractor treads 15 during the cutting operation. A 20 horsepower A. C. motor 14 is provided for tramming or movement of the machine in either direction at a much faster rate when not cutting. The machine is provided with right and left main chassis frame members 16 and 17, respectively.

The cutting head comprising the front end face cutters C and the motors and gearing for driving these cutters are all tiltable as a unit (gear box) about a trunnion axis 18, Figs. 3 and 4, in order that the course of the machine can be changed upwardly or downwardly. For removal of the cusps of coal left between the rotatable cutters C at the top and bottom of the hole, transversely fixed blades 32, are provided on the cutting head at the front of the shroud.

To laterally shift the front of the machine, guide shoes 22 on the cutting head are laterally adjustable together to the right or to the left. Guide shoes 23 at the rear end of the machine are not adjustable. A ⅓ horsepower motor 25 drives a reduction unit 26, described below, for raising or lowering the right end of the trunnion axis 18 for the correction of any lateral tilt (spiral), this drive being through a worm in the housing 27 which is described in detail below. The motors 10 and 11 are arranged on the side of the trunnion axis 18 opposite the main body of the head, to assist in counterbalancing the cutting head and to eliminate universal joints which might otherwise be needed. The weight of these motors is assisted by a counterbalancing spring 28.

A forward portion of the front gear box (head) 29 is enlarged to function as a shroud and prevent loose particles of coal passing rearwardly except on the flight conveyor D. The blade 32 at the top of the machine is pivotally mounted by pins 30 supported by a bracket 31 from the top of the front gear box. This blade at the top is movable as a unit while the lower blade is not adjustable or tiltable except as the head tilts.

An hydraulic cylinder 33, Fig. 4, located between the motors 10 and 11, is provided for tilting the cutting head to change the vertical course of the machine. At the left front side of the machine, Fig. 4, is a ⅓ horsepower motor 34 which drives a worm gear enclosed within housing 35 for laterally shifting the guide shoes 22. Enclosed within housing 36 are a potentiometer and actuating means for indicating on a voltmeter, located outside the bore hole, the position of such guide shoes 22. As the cutting head tilts upwardly or downwardly the front end portion of the flight conveyor D is also arranged to tilt with it about an axis 37, Fig. 3. Springs within housings 40, Fig. 3, enable the treads 15 to yield upwardly so that the treads 15 are yieldable with respect to the track frame members 38. As shown in Fig. 3 track idler hub axis 41 is adjustable forwardly and backwardly as a unit with its bearing by a screw 42 to control tension in the treads. Within the housing 43, Fig. 4, is a level sensitive device of an automatic course controller which is described below.

Referring to Fig. 3, the arrow 135 indicates the direction of the thrust encountered by the mining machine during the cutting operation and offered to it by the coal face being cut. Opposing this thrust 135 the machine has to be moved forward by its endless treads engaging the floor 136 of the hole. The arrows 137 shown at the lower rear end of the machine on the ground line indicates the direction of thrust offered the machine by the ground as the machine moves forward during cutting. Due to these arrows 135 and 137 being opposed and spaced apart vertically there is a tendency for the machine to tilt and for the effective center of gravity of the machine to move rearwardly.

Improved traction is obtained by means permitting the treads 15 to yield upwardly or downwardly with substantially constant resistance to conform to any unevenness in the floor of the hole.

In Figs. 6 and 8 are shown details of the transmission mechanism from the (slow track) motor 13 for driving the machine forward during cutting. From the motor 13, Fig. 5a, power is transmitted through a coupling 196 to shaft 197 and a reduction gear comprised of a pinion 198 driving a large gear 199 on the same shaft with small gear 200 driving the large gear 201 which drives the shaft 167, Figs. 5a and 6. Slidable along the shaft 167 is an internal gear mounting flange 203 meshing therewith, and secured to the internal coupling gear 204 adapted to mesh with and slide over the gear 225. Outside a reduced diameter portion of the gear flange 203 is a non-rotatable gear shifter ring 205, longitudinal movement of which is transmitted to a splined gear flange 203 through its bearing 306 between the gear shifter ring 205 and the splined gear flange 203. Fixed to this gear shifter ring 205 is a key 207, slidable within a keyway 208 in the block 209 secured to a partition wall 210 in the rear gear box 161. Pins 211 project from opposite sides of the gear shifter ring 205 and are engaged by the bifurcated ends of shifter levers 212 pivoted at 213 to the block 209 and capable of sliding the gear shifter ring 205 for engagement and disengagement of the internal coupling gear 204 with and from its cooperative gear 225.

For shifting the levers 212 the base portion 214 is connected with a piston rod 215 whose opposite end 216 is threaded in order that a retaining plate 217 for the spring 218 may be held against a shoulder 219 on this piston rod by lock nuts 220. The cylinder 221 containing the piston 222 is adapted to receive fluid pressure through the intake pipe 223. Any fluid on the left side of the piston 222 is forced out through a passageway not shown into the reduced pressure portion of the cylinder containing the spring 218 and threaded shaft 216, finally moving out through the outlet pipe 224. The cylinder and spring housing are pivotally supported by the pins 202, one on each side of the cylinder. To engage the gears 204 and 225, fluid pressure is admitted to the cylinder 221 moving the piston 222 to the left and holding it there during the time that these gears are in engagement. Upon a cut off of the fluid supply pressure through the pipe 223 enough leakage in the cylinder 221 takes place between this cylinder and the housing around spring 218 for the pressure to drop substantially allowing spring 218 to move retaining plate 217 and piston 222 to the right, disengaging the internal coupling gear 204 and its cooperative gear 225. The position of these gears when disengaged is shown in Fig. 7.

A fast driving shaft 226 for moving the mining machine forward or backward at a tramming speed receives power from motor 14, Fig. 4, and transmits its power through a coupling 227 and bevelled gear 228 to the bevelled gear 229 shown in both Figs. 5a and 6. From bevelled gear 229 power is transmitted through the shaft 230 to the driving and driven gears 231 and 232 shown in Fig. 5a. Driving cups 233 are provided between driven gear 232 and friction clutch parts 234 from whence shaft 235 drives the sprocket 237 when the clutch parts are engaged. The chain 164 transmits motion to the sprocket 238 and shaft 239 on which is the driving worm 162. From worm 162 worm gear 163 on the shaft 240, Fig. 5a, drives a central gear 241 and the driven planetary gears 242, thence through shaft 243 to sprocket 244 which engages and drives the treads 15.

As shown in Fig. 5b a similar transmission mechanism is provided on the left side of the rear gear box for transmitting power to the left rear driving sprocket. The corresponding parts in Fig. 5b bear the exponent *a* to distinguish them from the equivalent elements on the right side of shaft 230 and driving gear 231. When the machine is being driven forward during cutting by variable speed motor 13 an electrical interlock (as described below) is provided to prevent power from being supplied to the (fast track) motor 14. The shaft 226 of the motor 14 rotates regardless of which motor is energized.

Fig. 5b also shows an elongated tube 247 containing a light source 245, rays from which pass through narrow slits 246 and 248 so that an operator outside the hole being cut may, if desired, visually steer (aim) the machine for the first 150 or 200 feet of its entry or until the light is no longer visible.

The conveyor train

In Figs. 9 to 10 are shown details of the conveyor sections E. Each section contains a motor 249 driving a pulley 249a through a flexible tension drive member 250. Pulley 249a is on a shaft 249b passing through to the other side of the conveyor section where another pulley 249c on shaft 249b drives the rear end roller 251 through another flexible tension drive member, not shown. A compressed air pipe 252 is provided on each conveyor section, such pipes being provided with flexible connections 253.

Conduits 254 for the power lines for energizing each of the conveyor motors are also provided with flexible connections 255 at their ends.

Cables 256 are carried by a bracket 256L on the right side of each conveyor section. Such cables contain power and control conductors leading from the reels M and N on the launching platform to the machine.

As shown in Fig. 10 the wheels F of each conveyor section are spaced so that the treads run in the grooves made by the outer cutters at the bottom of the bore, keeping the conveyor sections aligned especially when backing out of such bore, thereby avoiding buckling the conveyor train.

Hydraulic system of the machine proper

Referring to the piping diagram shown in Fig. 11, the operation of the hydraulic system of the mining machine A is set forth below. The system includes pumps 431, 434 and 435, pressure relief valves 436, 437 and 438, and a filter 439 in a tank 429 of hydraulic fluid (oil). Such pumps are driven by a motor 524, Fig. 14b.

Normal operating conditions

The piston 425 of positioning cylinder 33 is at position 426 and the cutting head C is centered. Solenoid valve S4 is energized admitting oil under pressure to cylinder C4, closing the bypass valve 427, and blocking an internal connection between port P10 and port P11. Lines L10 and L11 remain connected to the 4-way valve 428 through ports P8 and P9 via internal passages in the bypass valve 427. Solenoid valves S2 and S3 are de-energized, leaving the 4-way valve 428 in neutral position. Solenoid valve S1 is energized admitting oil under pressure to cylinder C1 keeping track shift cylinder piston 222 at position 430.

Raise cutting head

Bypass valve 427 remains closed. Energize solenoid valve S2, admitting oil under pressure to cylinder C2. Ports P7—P8 and P9 are now thru-connected to the upper half of the positioning cylinder 33 allowing oil under pressure to flow in from pump 431 via lines L5 to L7 and L11. Ports P3 to P8 and P10 are now thru-connected to the lower half of the positioning cylinder 33, allowing oil to return thru line L10 to the 4-way valve 428 and out of port P3 to the oil tank 429. Positioning cylinder piston 425 now moves toward position 432 raising the cutting head C.

When the cutting head is in a desired position, de-energized solenoid valve S2 allows oil in cylinder C2 to return thru line L2 and out of port "T" of the solenoid valve S2 to tank 429. A spring in the 4-way valve 428 returns the valve spool to neutral position, blocking ports P3, P5, P8 and P9, and connecting ports P6 and P7 to P4 allowing oil to flow from pump 431 through valve to tank 429. Positioning cylinder piston 425 will now remain where it was before solenoid valve S2 was de-energized.

Lower cutting head

Bypass valve 427 remains closed. Energizing solenoid valve S3 admits oil under pressure to cylinder C3. Ports P6 to P8 and P10 are now thru-connected to the lower half of the positioning cylinder 33, allowing oil to flow in from pump 431 via lines L5, L6 and L10. Ports P5, P9 and P11 are now thru-connected to the upper half of the positioning cylinder 33, allowing oil to return through lines L11 to the 4-way valve 428 and out of port P5 to the tank 429. Positioning cylinder piston 425 now moves toward position 430', lowering cutting head C. To hold the head C in a desired position solenoid valve S3 is de-energized.

Fast track operation

De-energize solenoid valve S1, allowing oil in cylinder C1 to return through line L1 and out port "T" of the solenoid valve S1 to the tank 429. Track shift cylinder piston 222 moves to position 433, disengaging the slow track drive clutch. De-energize solenoid valves S2 and S3 allowing the 4-way valve 428 to return to neutral position. Deenergize solenoid valve S4 allowing oil in cylinder C4 to return through line L4 to the solenoid valve S4 and out of its port "T" to the tank 429. The spring in the bypass valve 427 returns the valve spool to open position, internally connecting ports P10 and P11. Oil can now flow from the upper half and vice versa of the positioning cylinder 33 via lines L10 and L11. This condition allows the cutting head C to adjust its position to conform with the dips and rises in the bore as the machine trams in or out.

Electrical system

The bore mining machine A, Fig. 14a, is provided as pointed out above, with right and left hand constant-speed cutting-head drive motors 10 and 11; a reversible variable-speed slow track-drive motor 13, Fig. 14b; a reversible constant-speed fast track-drive motor 14; a machine conveyor constant-speed drive motor 12; a hydraulic pump constant-speed drive motor 524; a horizontal steering control constant-speed reversible drive motor 34, Fig. 14a; a spiral control constant-speed reversible drive motor 25; a horizontal probe constant-speed reversible drive motor 156, Fig. 14b; and a vertical probe constant-speed reversible drive motor 528, Fig. 14a. Each sectional belt conveyor is provided with a belt-driving motor 249, Fig. 9. The launching platform J is provided with a conveyor driving motor; two cable reel winding motors; a moveover rig drive motor 269, Fig. 12a; a hydraulic pump motor; and an electrical control house which is provided with a console 530, Fig. 12b. The face-belt conveyor H, Fig. 1, is also provided with a belt-driving motor, not shown.

Power is transmitted to a main circuit breaker 532, Fig. 12b, on the launching platform J from a three-phase, 440 volt, 60 cycle source through conventional power lines. Such circuit breaker 532 is connected to a bus-bar panel BBP which is also located on the launching platform P, by conductors A', B', C'. For simplification the various subsequent conductors of the wiring diagram are sometimes indicated by numbers at the terminals of the panels, and one or more conductors in a cable by a single line, such as cable X, for example, it being understood that the individual conductors in the cables are insulated from one another.

The launching platform J is also provided with the two cable reels M and N, one of which has a 57-conductor slip-ring means 533, Fig. 12a, and the other a 14-conductor slip-ring means 534, Fig. 12b. In general, the movable power leads, control leads and signal leads from such slip-ring means to the machine A and the sectional conveyors E are housed within the two elongated flexible cables 256, Figs. 9 and 10, which are connected at one end to the machine A, the other end portions each being wound on the respective two reels on the launching platform J corresponding to the slip-ring means 533, 534 associated therewith. The stationary leads from the slip-ring means 533, 534 are connected to corresponding power, control and indicating devices located on the launching platform, including a fuse panel 537, starting relay panels located on a wall 538, a hydraulic panel 539, bridge station 540, a cutter-head drive motor starting panel 542, variable speed regulator panel 541, and a sectional conveyor starter panel 543.

The wall 538 contains twelve motor starters, to wit: a work circuit starter 544, Fig. 12a, a platform hydraulic pump motor starter 545, a moveover rig motor starter 546, a mining machine auxiliary hydraulic pump motor starter 547, a three-phase fused disconnecting switch 548, a horizontal probe motor starter 549, a platform conveyor motor starter 550, a vertical probe motor starter 551, a machine conveyor motor starter 552, Fig. 12b, a fast-track drive motor starter 553, and two spare starters 554 and 555.

The wall 556 on which the fuse panel 537, Fig. 12a, is mounted also has mounted thereon a spiral control motor starter 557, and a horizontal control motor starter 558.

The wiring diagram of the control house console 530, Fig. 12b, is shown in detail in Figs. 13a and 13b. The various switching stations are labeled on the latter drawings. For convenience and brevity such stations are not described in detail here but are referred to below in describing the functions of the several individual control circuits under appropriate headings. Lamps L for indicating the condition of the various circuits are conveniently located, as illustrated, but in general are not numbered in the following description in the interest of brevity.

In operation, the main circuit breaker 532, Fig. 12b, is closed to supply three-phase power to the launching platform bus-bar panel BBP. This puts three-phase power on small starter-power supply conductors 560, 561 and 562; on variable speed regulator power supply conductors 563, 564 and 565; sectional conveyor starter-power supply conductors 566, 567 and 568; left-hand cutting-head drive motor starter-power supply conductors 569, 570 and 571; and right-hand cutting-head drive motor starter-power conductors 572, 573 and 574.

Work circuit

Closing "on" push-button switch 575, Fig. 13b, energizes a holding circuit comprising wires 576, 577, 578 and 579. This closes a work circuit starter on panel 544, Fig. 12a, which applies power from busses 560, 561, and 562 on control circuit busses 580, 581 and 582 on the launching platform. It also operates a relay 583, Fig. 13b, between conductors 578 and 579 to close a switch 584 which applies D. C. power from busses 585 and 586 on instrument power supply busses 587 and 588 running both to the bore mining machine A and to the launching platform J. It also operates a relay 589 between conductors 578 and 579, opening a switch 590, which de-energizes "off" lamp 591. All A. C. and D. C. power to the machine A and launching platform J is disconnected by opening an "off" push-button switch 592 between conductors 577 and 578, or an emergency stop push-button switch 593 between conductors 577 and 594, located on the bridge. Busses 580 and 581, Fig. 13b, supply power to all of the push-button switching stations. Bus 582 is a spare.

Machine auxiliary hydraulic pump control circuit

Closing "start" push-button switch 595, Fig. 13b, energizes a holding circuit including wires 596, 597 and 598. This closes contacts in a machine auxiliary hydraulic pump motor starter on panel 547, Fig. 12a, and puts power from busses 560, 561 and 562 on leads 599, 600 and 601, energizing the hydraulic pump motor 524 carried by the machine A, Fig. 14b. Operating "stop" push-button switch 602 between conductors 580 and 596, Fig. 13b, breaks the holding circuit and de-energizes the motor 524.

*Manual vertical control circuit*

Operating the "up" push-button switch 603, Fig. 13b, to close the circuit between conductors 631 and 604 energizes a spring loaded solenoid valve S2, Fig. 14b, between conductor 604 and the solenoid's common conductor 606. The valve shifts and admits oil to a cylinder on one end of the four-way valve and shifts it to the "up" position, allowing hydraulic fluid under pressure to flow to the positioning cylinder 33, Fig. 12a, which tilts the front gear box 608 (boring head) upwardly with respect to tractor T about the transverse axis near the front of machine A. When the heads are clear of the launching platform J, the button controlling switch 603 is released and the solenoid valve S2 opens to the tank. The spring loaded four-way valve thereupon shifts back to neutral, blocking the oil inlets to both ends of the positioning cylinder and locking the gear box 608 (boring head) in elevated position.

To tilt the (gear box) head down to any desired position, "down" push-button switch 609 is operated to close the circuit between conductors 632 and 610. This energizes another spring loaded solenoid valve S3 between conductors 610 and the solenoid's common conductor 606. The valve shifts and admits oil to the cylinder on the other end of the four-way valve and shifts it to the "down" position, allowing oil flow to the other side of the positioning cylinder 32, which tilts the front gear box downwardly. Upon release of the button controlling switch 609 the solenoid valve opens to the tank and the four-way valve shifts back to neutral.

A potentiometer 612 connected across instrument power supply conductors 587 and 588 and located on the cylinder 33 indicates (on a tilt meter 615, Fig. 13b) the cylinder position, i. e., the relative position of the front gear box 608 with respect to the tractor T. The center tap of such potentiometer 612 is connected to a wire 616. A pendulum operated potentiometer 617 connected across conductors 587 and 588 and located on the gear box 608 indicates (on a meter 618, Fig. 13b) the degree of gear box tilt with respect to a horizontal plane. The center tap of potentiometer 617 is connected to a wire 619 leading to the meter 618. An ammeter 620, Fig. 13b, is connected in series with the solenoid's common wire 606 to indicate the current demand of the solenoid valves S1 through S4. The manual vertical course control circuit is used for tilting the front gear box 608 as desired when the machine A is launched, or when it is in operation to make a directional change while bore mining, since the circuit is arranged so that operation thereof overrides the automatic vertical course control circuit described below.

*Automatic vertical and spiral course control circuit*

The automatic course control circuit causes the machine to operate in a predetermined attitude regarding tilt and spiral, without the constant attention of an operator. It is more fully disclosed and claimed in application Serial No. 307,246, filed August 30, 1952, now Patent No. 2,761,666, by Heimaster and Spracklen, for "Remotely Controlled Bore Mining Machine-Automatic Course Controller."

The tilt and spiral controllers are separate detection and correction devices which together make up the automatic course controller ACC. Both controllers operate on the principle of bridge circuits. For each control, one side of the bridge is adjustable to provide a desired course setting, while the other side of the bridge is responsive to gravity and detects any variation of the boring head (gear box) 608 from the desired course. The functions of both sides of the bridges are accomplished by means of potentiometers. The detection sides of the bridges consist of sensitive potentiometers 617, 622 mechanically connected to pendulums which detect any deviations of the head from desired tilt and spiral settings.

The control side (potentiometer 623, the setting of which, relative to the actual tilt, is indicated by deviation (differential) meter 624, Fig. 13b) of the automatic tilt controller is variable to make course selection (climb or dive) possible. Since the desired course in the present case for spiral is always constant, i. e., true horizontal, the control side of the spiral controller generally needs to be adjusted only once. In either course controller circuit, when deviation from the desired course occurs, the corresponding bridge circuit becomes unbalanced and the resulting voltage is impressed on the control grid of a thyratron. When the value of such voltage overcomes the limiting value of the voltage on the thyratron grid governed by the sensitivity control, the thyratron commences firing, energizing the coils of a differential relay. The relay activates the correction circuits in which is the reversible motor 25, Fig. 14a, for correcting any spiral deviation by moving the right side of the gear box 608 up or down with respect to the tractor T, while pivoting about the other side of the gear box; or the solenoid-operated hydraulic four-way valve which causes the positioning cylinder 33 to tilt the gear box 608 up or down about the transverse axis 18.

The general electrical circuits involved will now be described. The outside taps of both bridge circuits are connected to wires 587 and 588 which are supplied with power by the stabilized source of voltage (direct current) 625, Fig. 13b. The center tap of the spiral detection potentiometer 622, Fig. 14a, is connected to wire 626, and that of the tilt detection potentiometer 617 is connected to wire 619. The center tap for the tilt control potentiometer 623, Fig. 13b, is connected to wire 627. Since the spiral control side of the bridge is within the chassis of the course controller ACC, its center tap is not shown.

Current from a stabilized source of A. C. which operates the differential relays enters the course controller chassis through leads 628 and 629. One side of the source of power for the control circuits to the machine A enters the controller chassis through a lead 630 which is connected to conductor 580. The controller leads 631 and 632 are connected to the machine conductors 604 and 610 which induce the shifting of the four-way hydraulic valve mechanism on the machine which corrects for tilt deviation. The controller leads 633 and 634 similarly are connected to conductors 635 and 636 which control a reversing motor starter 557, Fig. 12a, causing the motor 25, Fig. 14a, to correct for any spiral deviation from the selected course by automatically moving the bearing on the right-hand side of the transverse axis (tilt) between the (head) gear box up or down as required with respect to the tractor T.

*Cutting head motor control circuit*

Closing "start" push-button switch 637, Fig. 13a, between conductors 580 and 581 energizes wires 638, 639 and 640 of a holding circuit (not shown) for the two motors 10 and 11, Fig. 14a, which drive the front cutters. This closes starters 542, Fig. 12b, on the cutting head drive which put power from busses 569, 570 and 571 on the left-hand cutter drive motor leads 641, 642 and 643; and power from busses 572, 573 and 574 on the right-hand cutting head driving motor leads 644, 645 and 646. This energizes the motors 10 and 11 which drive the cutting heads in the front of the gear box 608.

Operating the "stop" push-button switch 647 between conductors 580 and 638 breaks the holding circuit, de-energizes the motors 10 and 11 and stops the cutting heads. Left- and right-hand current transformers (not shown) are connected to the left-hand motor power busses 569 and 571 and the right-hand power busses 572 and 574. The leads from the left-hand transformers to a left-hand wattmeter 648, Fig. 13b, are 649, 650, 651 and 652. The leads from the right-hand transformers to a right-hand head driving motor-wattmeter 653 are 654, 655, 656 and 657. The potential leads to the wattmeter 648 (connected to the left-hand head driving motor) are 658, 659 and 660, which are connected to the left-hand driving motor leads 643, 642 and 641, respectively. The potential leads to the wattmeter 653 (connected to the right-hand driving motor) are leads 661, 662 and 663 which are connected to the right-hand head driving motor leads 646, 645 and 644, respectively.

An ammeter 664 for indicating current drawn by the right-hand motor 10 is connected in series ith the wattmeter current lead 654. A similar ammeter 665 for the left-hand driving motor 11 is connected in series with current lead 649. A thermocouple 666, 667, Fig. 14a, is located in each motor 10, 11, the left motor's thermocouple leads being 668 and 669, and the right motor's leads being 669 and 670. A pressure switch 671, Fig. 14a, located in the motor's cooling oil system closes and energizes from leads 580, 581 a lamp 672, Fig. 13b, through wires 673 and 674 when the oil pressure fails.

Variable speed regulator control circuit

Closing "start" push-button switch 675 or 676, Fig. 13a, between conductors 580 and 677 energizes wires 678, 677 and 679 in a holding circuit (not shown). Wire 680 connects the bus 581 to the "V. S. R." (variable speed regulator) unit 541, Fig. 12b. This closes the V. S. R. unit starter which puts three-phase power from busses 563, 564 and 565 into the V. S. R. unit controls and starts an A. C.-D. C. generator set (not shown) which supplies D. C. power to the slow track motor 13, Fig. 14b, by means of a "Slow track control circuit" which is described below. Closing "stop" push-button switch 681 or 682 between conductors 678 and 679 breaks the holding circuit and de-energizes the V. S. R. unit starter.

Face conveyor control circuit

Closing "start" push-button switch 683, Fig. 13b, between conductors 580 and 684 energizes wires 685, 684 and 686 of a holding circuit (not shown). This closes a starter 540 located on the bridge which puts power from busses 687, 688 and 689 into the face conveyor driving motor. Closing "stop" push-button switch 690, Fig. 13b, between conductors 580 and 685 breaks the holding circuit and de-energizes such face conveyor driving motor.

Platform conveyor control circuit

Closing "forward" push-button switch 691, Fig. 13a, between conductors 692 and 693 energizes wires 692, 694 and 693 of a holding circuit (not shown). This closes a platform conveyor starter 550, Fig. 12a, which puts power from busses 560, 561 and 562 on the platform conveyor motor leads 695, 696 and 697 energizing the motor 519 to drive the conveyor in a forward direction. To reverse, closing "reverse" push-button switch 698, Fig. 13a, between conductors 692 and 699 energizes wires 692, 699 and 693. This closes another set of contacts in starter 550, Fig. 12a, which put power from busses 560, 561 and 562 on the motor leads 697, 696 and 695 energizing the motor to drive the conveyor in reverse. Operating "stop" push-button switch 700, Fig. 13a, between conductors 580 and 701 breaks the holding circuit and stops the platform conveyor; this also stops the sectional conveyor train, the machine conveyor, and the slow track motor as a result of the operation of interlocking circuits which are described below.

Sectional conveyor control circuit

With the platform conveyor running in the forward direction, wire 702, Fig. 13a, furnishes power from conductor 693 to the sectional conveyor push-button switching station. Thus the sectional conveyor drive motor or motors 249 cannot be started unless the platform conveyor drive motor 519 is running. Closing "start" push-button switch 703 between conductors 702 and 704 energizes wires 705, 704 and 706 of a holding circuit (not shown). This closes starter 543, Fig. 12a, which puts power from busses 566, 567 and 568 on the sectional conveyor drive motor leads 707, 708 and 709. Wires 232 and 233 apply power from leads 707 and 708 to a vibrator control unit including a half-wave rectifier 710, Fig. 12a, and to time delay relay 711. Wires 712 and 713 supply power to the vibrator 714, Fig. 14b, on the first conveyor, from the rectifier 710.

The time delay relay 711, Fig. 12a, allows the centrifugal switches to reach operating speed by by-passing them momentarily as a part of a holding circuit (not shown). Upon closing, the switches then become part of the holding circuit including wires 715, 716 and 717. Thus if a centrifugal switch opens on any conveyor of the conveyor train, it breaks the holding circuit and stops all of the sectional conveyors, as well as the machine conveyor, and slow track motor, as pointed out below.

Operating "stop" push-button switch 718, Fig. 13a, between conductors 702 and 705 breaks the holding circuit and stops the sectional conveyors; also the machine conveyor and slow track motor as a result of the operation of interlocking circuits which are described below.

Wires 719, 720 and 721, Fig. 12a, from busses 566, 567 and 568 furnish power to a traveling hoist plug 722.

Machine conveyor control circuit

With the platform and sectional conveyors running, wire 723, Fig. 13a, furnishes power from conductor 704 to the mining machine conveyor push-button switching station. Thus the mining machine conveyor cannot be started unless the platform conveyor and sectional conveyors are running. Closing "forward" push-button switch 724 between conductors 744 and 725 energizes wires 726, 727 and 725 of a holding circuit (not shown). This closes a forward set of contacts on the mining machine conveyor starter 552, Fig. 12b, which puts power from busses 560, 561 and 562 on machine conveyor motor leads 728, 729 and 730, energizing the motor to drive the conveyor in the forward direction.

To reverse the direction of the mining machine conveyor, closing "reverse" push-button switch 731, between conductors 744 and 732 energizes wires 725, 727 and 732. This closes a reverse set of contacts of starter 552 and puts power from busses 560, 561 and 562 on the motor leads 730, 729 and 728, energizing the motor 12 to drive the conveyor in the reverse direction.

Operating "stop" push-button switch 733 between conductors 580 and 734 breaks the holding circuit and stops the machine conveyor and also stops the slow track motor 13 as a result of an interlocking circuit which is described below.

A switch 735, Fig. 13a, is provided between the bus 580 and the push-button switching station for emergency operation of the machine conveyor independently of the other conveyors. This is accomplished by operating the switch 735 to open the normally closed connection of the switch 735 with conductor 723 and closing that with bus 580.

Motor lead 728, Fig. 12b, is fed through an overload coil 736, and ammeter 737 by wires 738 and 739. In event of conveyor overload or stall, the overload coil 736 closes a relay switch 740 in a 110 volt A. C. circuit 741, 742 and blows a horn 743.

Slow track control circuit

With platform, sectional, and machine conveyors running, wire 744, Fig. 13a, conducts current through an interlock by-pass switch 745 (when the latter is normally closed in its upper position) to the winding 746 of a relay 747, to the bus 581 and closes switch 748 thereof. The slow track clutch must also be engaged, which closes a limit switch 749, Fig. 14b, and completes a circuit through the winding 750 of a slow track interlock relay 751 by way of conductor 752 to bus 581 closing switch 753 thereof. The switches 748 and 753 of relays 747 and 751 are in series circuit relation. Thus, the slow track motor 13, Fig. 14a, cannot be started unless the platform, sectional, and machine conveyors are running, and the slow track clutch is engaged.

Closing "forward" push-button switch 754 between conductors 755 and 756 energizes wires 757, 758, 755 and 756 leading to the V. S. R. unit 541, Fig. 12b. This applies the output of the V. S. R. device to the armature of the slow track motor 13, Fig. 14b, through wires 759, 760, 761 and 762. This output voltage, the value of which can be read on a speed indicator 763, Fig. 13a, connected between conductors 764 and 765, is manually regulated by a potentiometer 769 through conductors 770 and 771. The field of the motor 13 is always energized, when the V. S. R. unit 541 is running, through conductors 772 and 773, Fig. 12b.

Closing "reverse" push-button switch 774, Fig. 13a, between conductors 775 and 756 energizes wires 757, 758, 775 and 755 which reverse the polarity of the leads to the armature, thus reversing the slow track motor 13. Closing "stop" push-button switch 776 between conductors 757 and 758 stops the slow track motor 13. The switch 745 is provided to by-pass the conveyor electrical interlock for the emergency use of the slow track by opening line 725 and connecting relay coil 740 directly to bus 580.

A relay 777, Fig. 13a, having the winding 778 thereof connected between conductors 756 and 779, opens its switch 780 automatically when the forward slow track motor 13 is started and prevents power winding operation of the cable reels by breaking the circuit between conductors 781 and 782, releasing the reels.

Track clutch shifting control circuit

To shift the clutch into slow track position, switch 783, Fig. 13a, is moved to the left to "slow" position. This energizes a solenoid valve S1, Fig. 14b, between conductors 606 and 786 and opens it. Oil under pressure thereupon moves the piston in the single acting spring loaded cylinder 221, Fig. 11, and shifts the clutch to slow track position 430. The clutch in such position closes a limit switch 749 between conductors 752 and 790, which energizes the clutch slow track interlock relay 751.

Moving the switch 783 to the right to "fast" position de-energizes the spring loaded solenoid valve S1 and it closes, shutting off oil flow to the cylinder and opening it to the tank. The spring loaded piston in the cylinder then shifts the clutch to the fast track position 433, which also closes a limit switch 791 between conductors 792 and 793, and completes the interlock circuit serving the fast track set-up. Thus, the fast track motor 14 cannot be operated unless the fast track clutch is closed.

Also in event of power failure at the machine while in a hole, or fast track motor starter or control circuit trouble, the clutch being held in fast track position mechanically, is unaffected. The bore mining machine can then be backed out of the hole by supplying power to an emergency plug 794, Fig. 12b, on the platform, throwing an emergency knife switch 795 and supplying power directly to the fast track motor leads 796, 797 and 798.

Fast track control circuit

With the fast track clutch in position and the limit switch 591, Fig. 14b, closed, power is furnished to the fast track push-button switching station. To operate the fast track forward, "forward" push-button switch 799 is closed between conductors 800 and 801, which energizes a holding circuit including conductors 800, 801 and 802. This closes the forward set of contacts in starter 553, in Fig. 12b, which puts power from busses 560, 561 and 562 through the emergency knife switch 795 on the motor leads 796, 797 and 798. Conductor 801 also furnishes power to the coil 804 of a forward fast-track cable interlock relay 805, Fig. 13a, which opens a switch 806 between conductors 781 and 782, thus making the cable winding drive motors of the cable reels inoperative.

To operate the fast track motor 14 in reverse, closing "reverse" push-button switch 807 between conductors 800 and 803, energizes a holding circuit including conductors 800, 801 and 803. This closes the reverse set of contacts in starter 553 which puts power from busses 560, 561 and 562 on the motor leads 796, 797 and 798. "Stop" push-button switch 808 is operated to break either holding circuit and stop the fast track motor 14.

The push-button operated switches 799, 807, 808 are duplicated on the platform by similar switches 809, 810 and 811, respectively.

Positioning cylinder by-pass control circuit

The positioning cylinder by-pass is opened whenever the fast track is used, whether forward or reverse. When opened the positioning cylinder by-pass valve connects together both ends of the double acting cylinder. Thus, the front gear box 608 and heads float freely whenever the fast track is used.

Moving switch 812, Fig. 13b, to "closed" position in engagement with contact 813, energizes wire 814 connected to the solenoid valve S4 which is also connected to the solenoid's common phase line 606, and opens the solenoid valve S4, Fig. 14b, admitting oil to the single-acting cylinder, activating the by-pass valve. The spring loaded by-pass valve then shifts, putting the two inlet lines in series respectively with the two pressure ports on the four-way valve. During normal operation of the mining machine this valve is held in such position.

Moving the switch 812 to "open" position in engagement with contact 816 breaks the power supply circuit to the solenoid valve S4 and it opens to the tank. The spring loaded piston then moves the by-pass valve to the open position. Also, in event of a power failure the heads and gear box 608 are free to float by virtue of such circuit arrangement.

Manual spiral control circuit

Operation of the switches at manual spiral push-button station, Fig. 13b, overrides the automatic spiral controller ACC. Pushing "up" push-button switch 817 energizes wires 635 and 818, closing the contacts of starter 557, Fig. 12a. This puts power from busses 560, 561 and 562 on the spiral motor leads 819, 820 and 821 and elevates the right side of the gear box 608 and heads of the bore mining machine with respect to the tractor frame of such machine. Releasing the button opens switch 817 which breaks the circuit and stops the motor 25, Fig. 14a.

Pushing "down" push-button switch 822 energizes the "down" relay coil through wires 636 and 818, closing another set of contacts in starter 557. This puts power from busses 560, 561 and 562 on the spiral motor leads 819, 820 and 821, reversing the motor 25 and lowering the right side of the gear box 608 and heads with respect to the tractor frame of the machine. Releasing the "down" button opens switch 822 which breaks the circuit and stops the spiral motor 25.

The manual spiral control is used for a spiral correction while the machine is in operation, boring or drilling. The relative position of the spiral control with respect to the horizontal is indicated by a meter 823, Fig. 13b.

from a potentiometer 824, Fig. 14a, which is geared to a reduction unit 26. The terminals of the potentiometer 824 are connected to leads 587 and 588. The center tap of the potentiometer is connected to lead 825.

Another potentiometer 622 which is connected across conductors 587 and 588 is actuated by a pendulum mounted on the front gear box. Its center tap is connected to wire 626. This potentiometer indicates on a meter 826, Fig. 13b, the degree of gear box spiral with respect to the horizontal at all times.

Horizontal steering control circuit

Operating "left" push-button switch 827, Fig. 13b, energizes a relay coil of a starter 558, Fig. 12a, through wires 828 and 829 closing the "left" contacts. This puts power from busses 560, 561 and 562 on horizontal steering motor leads 830, 831 and 832 and moves the right shoe against the right wall of the bore, forcing the machine to cut or bore to the left. The right and left shoes are tied together so that as one shoe moves outwardly, the other moves inwardly an equal amount. Releasing the button opens switch 827 which breaks the circuit and stops the horizontal steering motor 34, Fig. 14a.

Operating the "right" push-button switch 833, Fig. 13b, energizes the other relay coil of the starter 558 through wires 834 and 829, closing the set of contacts. This puts power from busses 560, 561 and 562 on the horizontal motor leads 832, 831 and 830 and reverses the motor 34, Fig. 14a, moving the left shoe against the left wall of the bore and forcing the machine to bore or cut to the right. Releasing the button opens switch 833 which breaks the circuit and stops the motor 34.

The relative position of the horizontal control with respect to the machine is indicated by a meter 835 connected to a potentiometer 836, Fig. 14a, geared to the reduction. The terminals of the potentiometer 836 are connected to leads 587 and 588. The center tap of the potentiometer is connected to wire 837.

Horizontal sight guide

The horizontal sight guide 247, a visual guide for horizontal control, is served by wires 839 and 840.

Horizontal probe control circuit

The horizontal probe, by measuring the ligament or stump thickness, indicates the exact position of the bore mining machine with respect to the preceding bore or hole.

In operation closing "forward" push-button switch 841, Figs. 13b and 15, between conductors 581 and 842 energizes the forward relay coil of starter 549, Fig. 12a, through wires 842 and 854 (which is connected to conductor 580), putting power from busses 560, 561 and 562 on the horizontal probe motor leads 847, 848 and 849. The button controlling switch 841 is held down until cutting pressure forces the probe back and closes a reaction limit switch 850, Figs. 14b and 15, which closes a holding circuit including conductors 606, 846, 845, allowing the probe to be run forwardly independently of the position of switch 841. Reverse limit switch 851 closes, and fast and slow track interlock limit switches 852 and 853 open.

Thus, the track driving means which propels the bore mining machine cannot be operated while the probe is in operation.

The coil 859 of a relay 860, Fig. 13b, is energized opening a switch 861 in the reversing circuit 872, Fig. 15. The probe motor 156 stops and reverses automatically if the probe breaks through the wall and the reaction limit switch 850 opens; or if the probe reaches the end of its forward travel without breaking through the wall, it opens a forward limit switch 862. Relay 860 is then de-energized and closes its switch 861. Thus, the reverse circuit is completed from lead 606 through conductor 872, relay switch 861, the push-button station, line 863 to conductor 854. The reverse switch closes, putting power from busses 560, 561 and 562 on probe motor leads 847, 848 and 849, reversing the probe motor 156. In the fully retracted position the reverse limit switch 851 opens breaking the reverse holding circuit and stopping the probe; and the slow and fast track limit switches 852 and 853 close between conductors 877 and 878, and 879 and 880, respectively, making the mining machine tractor driving means operable again.

A helipot (helical potentiometer) 869, Fig. 14b, connected between voltage supply leads 587 and 588 is mounted on and geared to the probe to indicate on a meter 870 the relative position of the horizontal probe at all times. The center tap of the helipot is connected to wire 871.

Vertical probe control circuit

Figure 16:
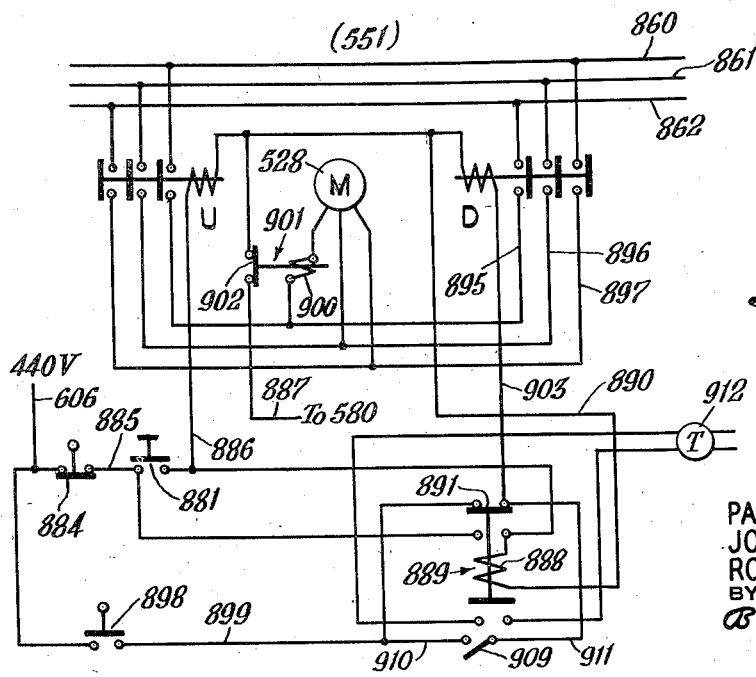
Fig. 16 is a circuit diagram of the vertical probe control.

Closing "up" push-button switch 881, Figs. 13a and 16, energizes the "up" coil of starter 551, Fig. 12a, from lead 606 through the upper limit switch 884, through conductors 885 and 886, and to lead 887. The coil 888 of "L" relay 889 is also energized in the same manner through conductor 890, closing (lower) switch 891 between conductors 885 and 886, creating a holding circuit independent of the push-button switch 881. The "up" contacts of starter 551 close, putting power from busses 860, 861 and 862 on the vertical probe motor leads 895, 896 and 897, and energizing the vertical probe driving motor 528. The lower limit switch 898 closes line 899 as the probe P36 starts upward.

The probe reverses automatically when the coil 900 of an overload relay 901 is energized, opening switch 902 in line 887; or when the probe P36 reaches the extreme "up" position, opening the upper limit switch 884, as set forth below. Either operation breaks the "up" holding circuit; establishes the reversing circuit; and the coil 888 of relay 889 is de-energized, and its upper limit switch 891 closes to energize a reversing holding circuit from lead 606, through the lower limit switch 898, through line 899, the relay switch 891, conductor 903, and "down" coil starter 551 to conductor 887, energizing the motor 528 to drive the probe down. When the probe P36 reaches the extreme "down" position, it opens the lower limit switch 898 and breaks the reversing holding circuit, stopping the probe until the "up" push-button switch 881 is closed again.

A switch 909 is connected by leads 910 and 911 across conductors 899 and 903 which can be closed to reverse the probe in event of an emergency.

A timer, Fig. 16, calibrated in units of travel is started manually, or by a switch 913 on relay 889, to indicate the extent of travel of the probe P36 before reversing it.

Platform hydraulic pump motor control circuit

Figure 17:
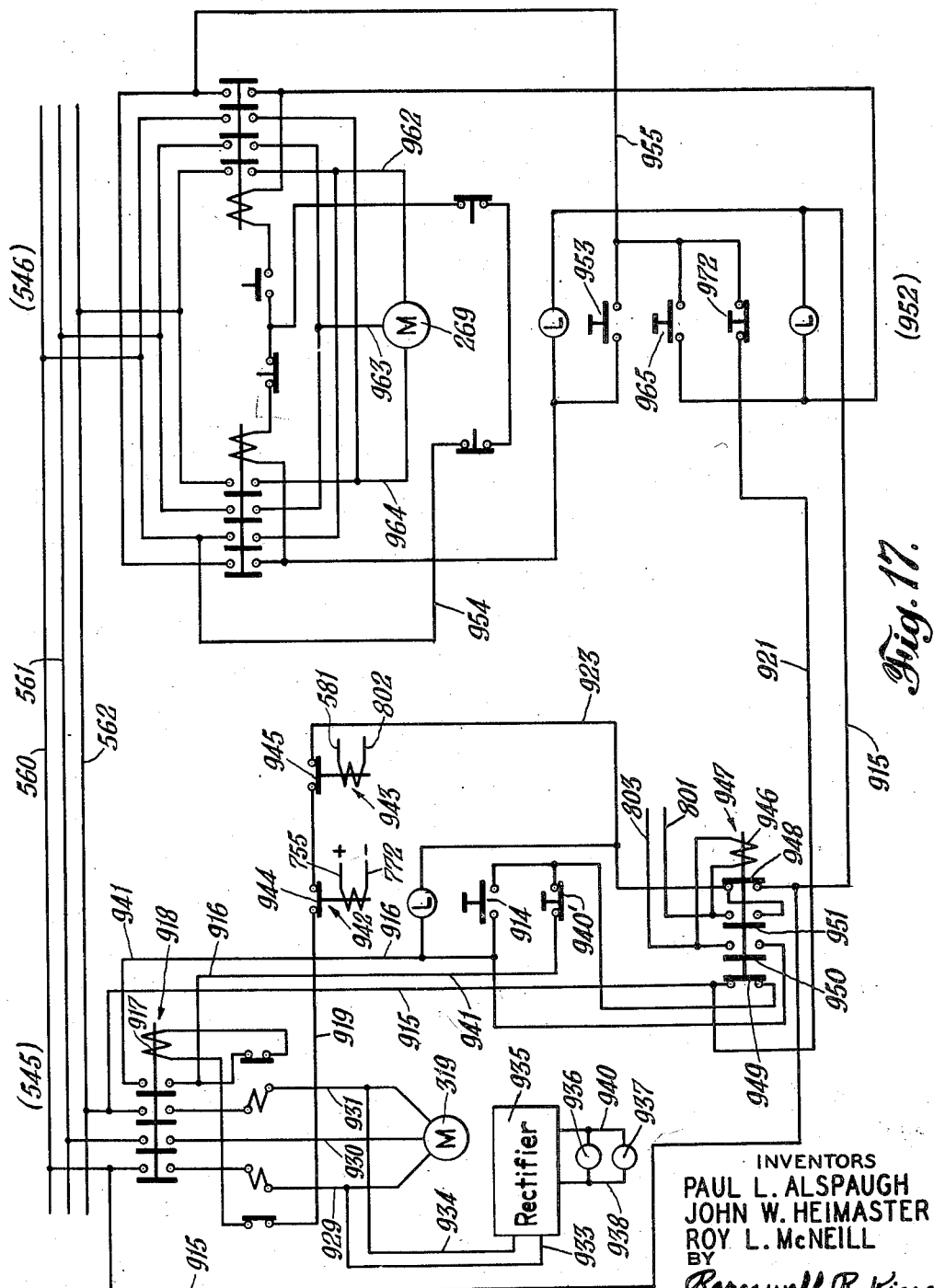
Fig. 17 is a circuit diagram of the electrical control for the platform hydraulic pump and moveover system.

Closing "start" push-button switch 914, Fig. 17, between conductors 915 and 916 energizes starter 545, Fig. 12a, which through wires 919, 916, 921, 915 and 923, Fig. 17, provides a holding circuit when the switch 914 opens upon release. Starter 545 also puts power from busses 560, 561 and 562 on leads 929, 930 and 931 of the platform hydraulic pump drive motor 319 located under panel 539, Fig. 12a, energizing such motor. Wire 933 from motor lead 929, and wire 934 from motor lead 931 serve as a source of A. C. power for a rectifier 935, which supplies D. C. energy to magnetic clutches 936 and 937 controlling the driving connection between the cable reels and the reel winding motors 324. Thus, the clutches are energized when the hydraulic pump motor is running. The D. C. leads from the rectifier 935 to the two clutches 936 and 937 are 938 and 940.

Operating "stop" push-button switch 940' between conductors 915 and 941 breaks the holding circuit and stops the motor 319. If the slow or fast track forward circuit is energized, relays 942 or 943, Figs. 13a and 17, are energized through leads 755 and 772, and leads 581 and 802, respectively, and break the holding circuit by opening switch 944 or 945 thereof, stopping the pump motor 319. If the fast track reverse control circuit is energized, wires 801 and 803 energize the coil 946 of relay 947, Fig. 17, opening switches 948 and 949 thereof and closing its switches 950 and 951, thereby starting the pump motor 319 and energizing the cable reel clutches 936 and 937, causing the reel winding motors 324 to wind the cables on the reels.

Moveover rig (platform) motor control circuit

The push-button switching stations of the platform hydraulic pump motor 319, Fig. 17; and the moveover rig motor 269, Fig. 12a; are located on the hydraulic panel. Wires 921 and 915, Fig. 17, also serve as a source of power for the control station 952 of the platform moveover rig motor 269.

Closing "forward" push-button switch 953, Fig. 17, between conductors 954 and 955 energizes the forward coil of starter 546, Fig. 12a, and through wires 954, 955 and 560 forming a holding circuit when switch 953 opens upon release thereof. The starter 546 also puts power from busses 560, 561 and 562 on the leads 962, 963 and 964 of motor 269, energizing the latter which thereupon drives the entire launching platform forwardly along the rails.

To reverse the direction of travel of the launching platform "reverse" push-button switch 965, Fig. 17, is closed. This energizes the reverse coil of starter 546 and through wires 962 and 954 forms a holding circuit which permits switch 965 to be opened. The starter 546 also puts power from busses 560, 561 and 562 on the leads 964, 963 and 962 of motor 269.

"Stop" push-button switch 972 between lines 955 and 921 is operated to break the holding circuit in case the platform is traveling either forwardly or backwardly on the rails, and stops the motor 269 and the platform.

Vibrator

A vibrator 714, Fig. 14b, on the first sectional conveyor is energized through a bayonet type disconnect plug 989 which is connected between the leads 712 and 713 when the first conveyor is attached to the machine, and such leads being energized by the rectifier 710, Fig. 12a, located on the launching platform. The vibrator 714 serves to keep material flowing from the machine conveyor through skirt boards leading to the belt of the first conveyor section.

Earth strata cutting indicating circuit

While the circuit for continuously indicating at the control station the relative hardness of the strata actually being cut by the bore mining machine in operation is claimed and disclosed in the copending application of Felbeck, Cook and Cosner, for "Earth Strata Cutting Indicators for Remotely Controlled Bore-Mining Machines," Serial No. 310,526, filed September 19, 1952, now Patent No. 2,752,591; a brief description of such circuit is set forth below.

The preferred "Stratascope" is broadly covered by Patent No. 2,620,386 of Alspaugh and Cook for "Earth Strata Cutting Indicator."

As shown in Figs. 13a and 14a, tooth-actuated-differential transformer transducers TR and TL, Fig. 14a, are mounted on the right and left rotary cutter heads of the bore mining machine, each (the left, for example) being connected by conductors 990, 991, 992 and 993 to suitable slip rings 994. Brushes corresponding to the slip rings leading to conductors 990, 991 are connected to a common A. C. oscillator 997, Fig. 13a, remotely located with respect to such machine, by conductors 998, 999, which extend through a shielded cable 256. The oscillator 997, in turn, is connected to a common constant-voltage supply transformer 1000 by conductors 1001, 1002. The transformer 1000, in turn, is connected to a power supply transformer 1003 by conductors 1004, 1005. The transformer 1003 is energized through leads 1006, 1007 which are connected to power supply busses 580, 581.

In operation the oscillator 997 supplies the input circuit of each transducer with current at a selected frequency. The brushes of the slip rings 994 leading to signal output conductors 992, 993 are connected by conductors 1008, 1009 to a step-down or cable impedance matching transformer 1010 which is, in turn, connected to a step-up or cable impedance matching transformer 1011, Fig. 13a, by conductors 1012, 1013 which extend through cable 256. Conductors 1014, 1015 connect the transformer 1011 to the signal input circuit of a left oscilloscope 1016, the base input circuit of which is connected by conductors 1017, 1018, 1019 extending through cable 256, to a two-phase generator 1020 which is driven synchronously with the cutter head on which the scanner-cutter tooth assembly is mounted. A right oscilloscope 1021 is similarly connected to such two-phase generator 1020 (which is common to both systems), and to the right transducer TR, respectively.

Since the cable 256 may be substantially long, i. e., of the order of 1000 feet long in some cases, it is shielded, grounded and of relatively low impedance. In use the cable 256 is unwound from the reel located outside of the bore being made by the machine as the mining operation progresses. The right and left stratascope systems are calibrated before boring is started to indicate the relative torque applied to the scanner teeth in cutting the various materials which are likely to be encountered by the machine.

Thus, when the bore mining machine is out of sight, the oscilloscopes 1016, 1021 quantitatively indicate the relative hardness of the different strata actually being cut by the respective scanning teeth which are located on right- and left-hand cutting heads in front of the main cutting teeth thereof, such hardness indications being visible before the main cutting teeth encounter such strata.

While we have described the invention in connection with the mining of coal, it will be obvious that the invention is not limited thereto.

We claim:

1. A remotely controlled mining system comprising the combination of a remotely controlled self-propelled bore mining machine, a launching platform for said machine, wheeled conveyor sections on said platform connected to said machine as it passes into the bore hole formed thereby, and in succession to preceding sections as they are drawn by the machine off of said platform, forming a conveyor train of increasing length as the boring proceeds for continuously conveying the material being mined by said machine back out of said bore hole onto said platform, and remote control means for controlling the operation of said machine and conveyor sections.

2. A remotely controlled bore-mining system comprising the combination of a self-propelled bore-mining machine, wheeled conveyor sections connected to said machine as it enters the bore hole made thereby, and in succession to preceding sections as they are drawn by the machine into said bore hole, forming a conveyor train of increasing length as the boring proceeds for continuously conveying material mined by said machine rearwardly through the bore made thereby, and a launching platform for said machine and conveyors, said launching platform including a conveyor for continuously removing the material discharged by said conveyor train, and remote control means located on said platform for controlling the operation of the entire bore-mining system.

3. The combination in a remotely controlled bore-mining system of a self-propelled bore mining machine constructed and arranged for boring through selected strata to be mined, leaving transversely spaced arcuate grooves in the floor of the resulting bore, of conveyor sections connected to said machine as it passes into the bore hole formed thereby, and in succession to preceding sections as they are drawn into said bore hole and having supporting wheels which are transversely spaced so as to roll in and be guided by said grooves as the system advances with the progress of the mining operation, remote control means for controlling the operation of said machine and conveyors, and means carried by said machine for continuously transporting the mined material from the front of the machine and depositing such material onto the front of such conveyor sections.

4. A bore mining system comprising the combination with a self-propelled bore mining machine, and continuous conveyor means comprising wheeled conveyor sections connected to said machine at the entrance of the hole bored thereby as the machine passes thereinto and in succession to preceding sections as they pass into said bore hole, thereby providing a conveyor train drawn by the machine of increasing length as the boring proceeds for transporting the material out of said bore hole, of remote control means for controlling the operation of the system from a control station located outside of such hole, comprising cable means running from said station to the machine, and means on said conveyors for carrying said cable means in such hole.

5. A bore-mining system comprising the combination with a self-propelled bore mining machine, and continuous conveyor means comprising wheeled conveyor sections connected to said machine at the entrance of the hole bored thereby as the machine passes thereinto and in succession to preceding sections as they pass into said bore hole, thereby providing a conveyor train drawn by the machine of increasing length as the boring proceeds for transporting the material out of said bore hole, of remote control means for controlling the operation of the system from a remote control station located outside of such hole, comprising cable means running from said station to the machine, in which the remotely-controlled bore-mining machine is provided with driving means, and information pick-up means responsive to a condition of the bore-mining operation of said machine, said station is provided with control means for said driving means and indicating means for said pick-up means, and said flexible cable means connected at one end to said machine, the combination therewith of reel means located at said station on which the other end portion of said cable means is wound, and conductor means including slip ring means associated with said reel means for conducting electrical power and signals between said machine and said station through said cable means drawn by said machine and supported by said conveyor sections as the machine travels with respect to said station and the cable reel means rotates in accordance with such travel whereby the operation of the machine in a bore hole mined thereby can be continuously controlled at said station which is remotely located with respect to such hole, even when said machine is out of sight in the bore hole.

6. A bore-mining system as defined by claim 5, in which the machine comprises at least one boring head, and a head-driving motor connected to drive said head, and the indicating means comprises a meter for indicating the relative value of the current flowing through the power-conducting means to said motor.

7. A bore-mining system as defined by claim 5, in which the indicating means also includes a meter for indicating the power requirement of the head-driving motor at any given instant.

8. A bore-mining system as defined by claim 5, in which the machine comprises a tractor for advancing and retracting such machine, including at least one tractor drive motor, and disconnecting and reversing means coupling said tractor drive motor and the tractor, the control means comprises switching means for operating said coupling means, switching means for energizing said motor from a suitable power source, and interlocking means for preventing the application of power to said motor unless said coupling means is closed so that the drive motor is connected in driving relation with said tractor.

9. A bore-mining system as defined by claim 8, in which the interlocking means comprises a switch controlling the flow of power to said motor through the power circuit, and means responsive to the position of said coupling means for controlling said switch, whereby the power circuit of said motor is held open as long as the coupling is open.

10. A bore-mining system as defined by claim 8, in which the tractor includes a fast track motor and a slow track motor, means connecting said fast track motor in driving relation with said tractor including a coupling and a speed reducing gear train, a second speed reducing gear train connected to said slow track motor, and means including said clutch for connecting the said second speed reducing gear train to said fast track reducing gear train, said clutch being disconnected when the fast track motor is used; and two limit switches controlled by the position of said clutch, so that when the clutch is positioned to connect one motor in driving relation with the tractor it closes a corresponding limit switch permitting power to flow to such motor, and open the other limit switch preventing power from flowing to the other motor.

11. A bore-mining system as defined by claim 5, in which the machine comprises a tractor and a drive motor therefor, the indicating means comprises a meter responsive to the current supplied to said motor, and a meter responsive to the voltage thereof and calibrated to indicate the speed of the tractor, and the control means comprises a variable speed regulator for said motor.

12. A bore-mining system as defined by claim 5, in which the machine comprises a conveyor drive motor; the indicating means comprises a meter for indicating the current demand of said motor, and a warning signal for indicating when the conveyor is overloaded; and the control means comprises a switch for opening the power supply circuit of said motor.

13. A bore mining system as defined by claim 5, in which the machine is provided with a vertical probe, and a probe drive motor therefor; the indicating means comprises a meter for indicating the load on said motor, which increases with the relative hardness of the material being probed, and a timer actuated when the probe is in operation calibrated to indicate the depth cut by said probe; and the control means comprises a switch for stopping the progress of said probe and reversing said motor.

14. A bore mining system as defined by claim 5, in which the machine is provided with a horizontal probe, and a probe drive motor therefor; and the indicating means comprises a spring loaded switch responsive to contact of the probe with the bore wall at one side of the machine and to break-through of such probe at the other side of said wall.

15. A bore mining system as defined by claim 5, in which a driving motor is connected to drive said reel means to wind the cable means thereon, means for energizing said reel winding motor including a control circuit, and means responsive to forward movement of the machine by said machine-driving means including a relay which operates when such forward movement starts to prevent energy from being supplied to said reel winding motor.

References Cited in the file of this patent

UNITED STATES PATENTS

| 1,016,980 | Bender | Feb. 13, 1912 |
| 1,290,594 | Levin | Jan. 7, 1919 |
| 1,372,318 | Saliger | Mar. 22, 1921 |
| 1,388,545 | Bohan | Aug. 23, 1921 |
| 1,444,775 | Bennett | Feb. 13, 1923 |
| 1,477,571 | Lichtenberg | Dec. 18, 1923 |

(Other references on following page)

UNITED STATES PATENTS

| | | |
|---|---|---|
| 1,562,872 | Davis | Nov. 24, 1925 |
| 1,620,531 | Fisher | Mar. 8, 1927 |
| 1,634,801 | Schneider | July 5, 1927 |
| 1,726,963 | McKinlay | Sept. 3, 1929 |
| 1,951,089 | Fielder | Mar. 13, 1934 |
| 1,998,294 | Thomas et al. | Apr. 16, 1935 |
| 2,182,477 | Hollingsworth | Dec. 5, 1939 |
| 2,250,141 | Thurston | July 22, 1941 |
| 2,320,196 | Roe | May 25, 1943 |
| 2,394,194 | McCarthy | Feb. 5, 1946 |
| 2,420,009 | Osgood | May 6, 1947 |
| 2,541,496 | Busick et al. | Feb. 13, 1951 |
| 2,589,220 | Buckeridge | Mar. 18, 1952 |
| 2,599,042 | Bannister | June 3, 1952 |
| 2,616,677 | Compton | Nov. 4, 1952 |
| 2,620,386 | Alspaugh et al. | Dec. 2, 1952 |
| 2,638,996 | Vanderzee | May 19, 1953 |
| 2,639,101 | Hair | May 19, 1953 |
| 2,674,364 | Cartlidge | Apr. 6, 1954 |
| 2,699,328 | Alspaugh et al. | Jan. 11, 1955 |

FOREIGN PATENTS

| | | |
|---|---|---|
| 981,860 | France | Jan. 17, 1951 |

OTHER REFERENCES

Coal Age, December 1948, pages 76 and 77.